United States Patent
Shinohara et al.

(10) Patent No.: US 9,167,320 B2
(45) Date of Patent: Oct. 20, 2015

(54) TRANSMISSION METHOD AND NODE DEVICE

(71) Applicant: FUJITSU LIMITED, Kawasaki-shi (JP)

(72) Inventors: Shota Shinohara, Kawasaki (JP); Wataru Odashima, Oyama (JP); Hiroyuki Homma, Kawasaki (JP); Junichi Sugiyama, Oyama (JP)

(73) Assignee: FUJITSU LIMITED, Kawasaki (JP)

( * ) Notice: Subject to any disclaimer, the term of this patent is extended or adjusted under 35 U.S.C. 154(b) by 131 days.

(21) Appl. No.: 13/847,516

(22) Filed: Mar. 20, 2013

(65) Prior Publication Data
US 2013/0259476 A1 Oct. 3, 2013

(30) Foreign Application Priority Data
Mar. 29, 2012 (JP) ................................ 2012-077866

(51) Int. Cl.
H04Q 11/00 (2006.01)
H04L 12/933 (2013.01)
H04J 3/16 (2006.01)

(52) U.S. Cl.
CPC .......... *H04Q 11/0005* (2013.01); *H04J 3/1652* (2013.01); *H04L 49/101* (2013.01)

(58) Field of Classification Search
None
See application file for complete search history.

(56) References Cited

U.S. PATENT DOCUMENTS

| | | | | |
|---|---|---|---|---|
| 6,088,371 A | * | 7/2000 | Inada et al. | 370/537 |
| 6,137,795 A | * | 10/2000 | Tominaga et al. | 370/375 |
| 2002/0006110 A1 | * | 1/2002 | Brezzo et al. | 370/229 |
| 2002/0191626 A1 | * | 12/2002 | Moriwaki et al. | 370/413 |
| 2008/0080860 A1 | * | 4/2008 | Katagiri | 398/43 |
| 2008/0226292 A1 | * | 9/2008 | Li et al. | 398/48 |
| 2013/0243427 A1 | | 9/2013 | LIN | |

FOREIGN PATENT DOCUMENTS

| | | |
|---|---|---|
| JP | 2011-176619 | 9/2011 |
| WO | 20101103018 A1 | 9/2010 |
| WO | 20111032315 A1 | 3/2011 |
| WO | 20111144172 A1 | 11/2011 |

OTHER PUBLICATIONS

JPOA - Office Action mailed on May 26, 2015 issued with respect to the basic Japanese Patent Application No. .2012-077866, with partial English translation.

\* cited by examiner

*Primary Examiner* — Kerri Rose
(74) *Attorney, Agent, or Firm* — Fujitsu Patent Center

(57) ABSTRACT

A transmission method for transmitting a lower-speed signal transmission frame using a node device in a network by accommodating the lower-speed signal transmission frame into time slots of a higher-speed signal transmission frame includes supplying, when a number of the time slots accommodating the lower-speed signal transmission frame is to be increased, the time slots to input numbers of a cross-connection part of the node device in accordance with an order of time slot numbers of the time slots; and re-establishing cross-connections where the input numbers are cross-connected to corresponding output numbers of the cross-connection part so that the cross-connections are prevented from crossing each other, wherein the input numbers input the time slots and the output numbers output the time slots.

14 Claims, 34 Drawing Sheets

FIG.4

| DATA FLOW AT "A" | | | | | | | | | | |
|---|---|---|---|---|---|---|---|---|---|---|
| TS#1 | DT1 | DT3 | DT5 | DT7 | DT9 | DT11 | DT13 | DT15 | DT17 | DT19 |
| | | | | | | | | | | |
| TS#3 | DT2 | DT4 | DT6 | DT8 | DT10 | DT12 | DT14 | DT16 | DT18 | DT20 |

FIG.6A

DATA FLOW AT "B"

| TS#1 | DTxx | DT1 | DT4 | DT7 | DT10 | DT13 |
|------|------|-----|-----|-----|------|------|
| TS#2 | DTxx | DT2 | DT5 | DT8 | DT11 | DT14 |
| TS#3 | DTxx | DT3 | DT6 | DT9 | DT12 | DT15 |

FIG.6B

DATA FLOW AT "C"

| TS#1 | DTxx | DT1 | DT3 | DT5 | DT7 | DT9 | DT11 | DT13 |
|------|------|-----|-----|-----|-----|-----|------|------|
|      | DTxx |     |     |     |     |     |      |      |
| TS#3 | DTxx | DT2 | DT4 | DT6 | DT8 | DT10 | DT12 | DT14 |

FIG.6C

DATA FLOW AT "D"

| TS#1 | DTxx | DTxx | DT1 | DT4 | DT7 | DT10 |
|------|------|------|-----|-----|-----|------|
| TS#3 | DTxx | DTxx | DT2 | DT5 | DT8 | DT11 |
| TS#4 | DTxx | DTxx | DT3 | DT6 | DT9 | DT12 |

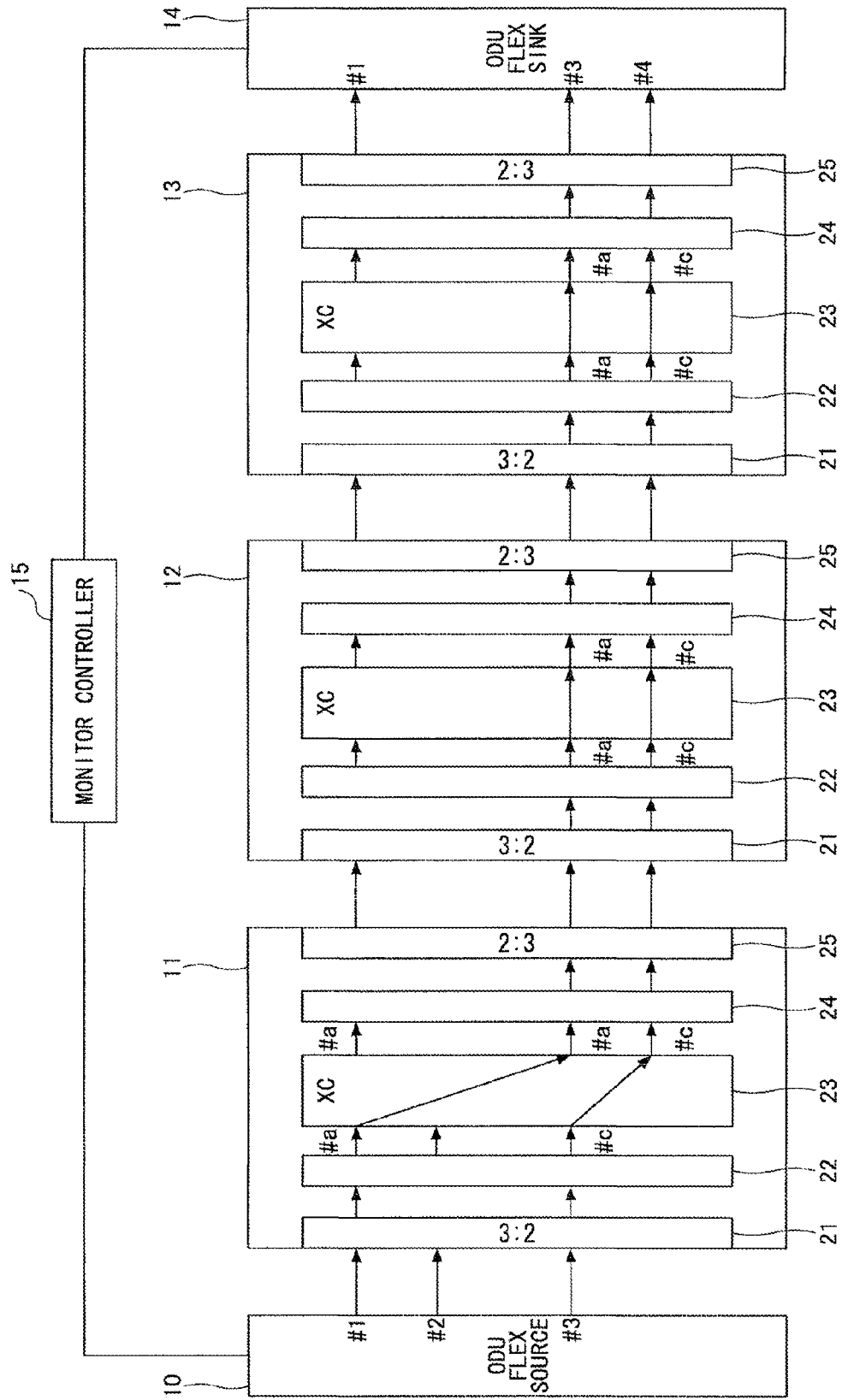

FIG.12

| DATA FLOW AT "E" | | | | | | | | | | |
|---|---|---|---|---|---|---|---|---|---|---|
| TS#1 | DT1 | DT4 | DT7 | DT10 | DT13 | DT16 | DT19 | DT22 | DT25 | DT28 |
| TS#2 | DT2 | DT5 | DT8 | DT11 | DT14 | DT17 | DT20 | DT23 | DT26 | DT29 |
| TS#3 | DT3 | DT6 | DT9 | DT12 | DT15 | DT18 | DT21 | DT24 | DT27 | DT30 |

FIG.15
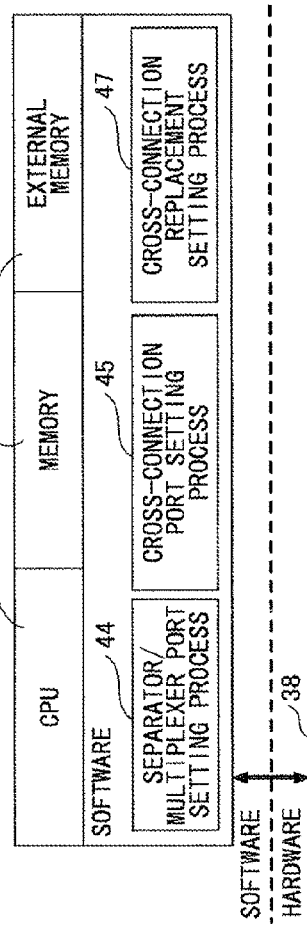
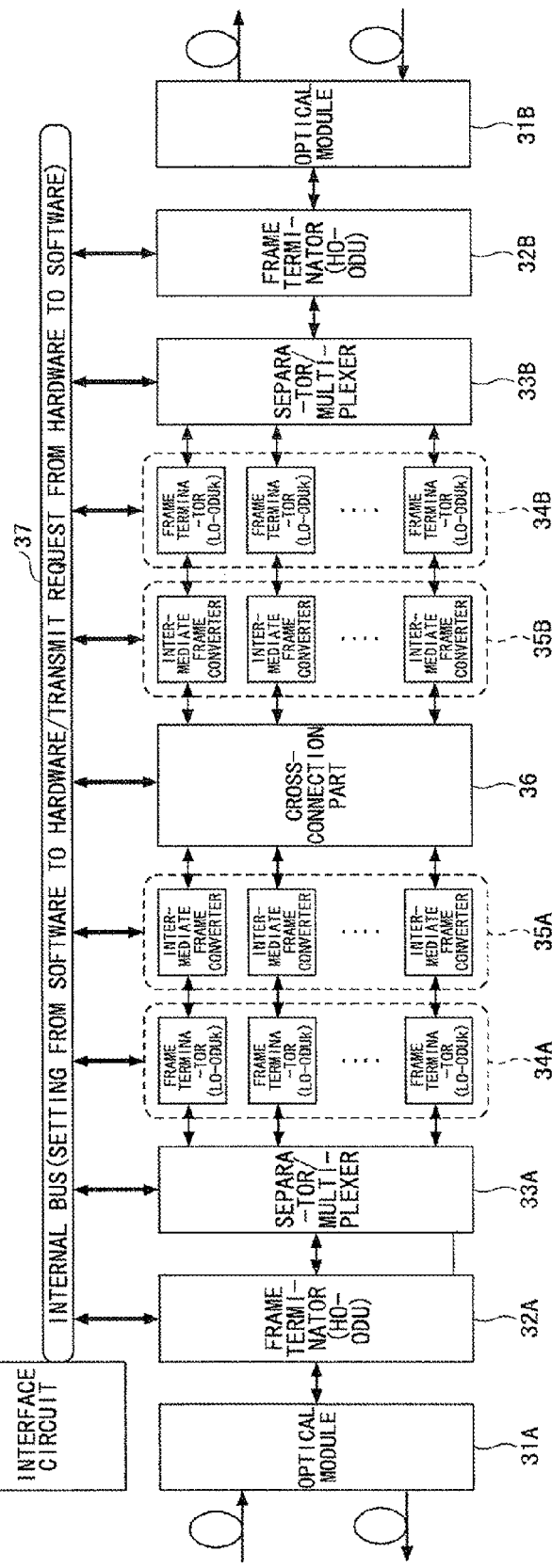

FIG.16

| INPUT NUMBER | OUTPUT NUMBER | | | | | | |
|---|---|---|---|---|---|---|---|
| 1 | 0 | 0 | 0 | 0 | 0 | 0 | 0 |
| 2 | 0 | 0 | 0 | 0 | 0 | 0 | 0 |
| 3 | 0 | 0 | 0 | 0 | 0 | 0 | 0 |
| 4 | 0 | 0 | 0 | 0 | 0 | 1 | 0 |
| 5 | 0 | 0 | 0 | 0 | 0 | 1 | 1 |
| 6 | 0 | 0 | 0 | 0 | 0 | 0 | 0 |
| 7 | 0 | 0 | 0 | 0 | 0 | 0 | 0 |
| ⋮ | ⋮ | ⋮ | ⋮ | ⋮ | ⋮ | ⋮ | ⋮ |
| 79 | 0 | 0 | 0 | 0 | 0 | 0 | 0 |
| 80 | 0 | 0 | 0 | 0 | 0 | 0 | 0 |

FIG.17

| TS NUMBER | INPUT NUMBER | | | | | | | | OUTPUT NUMBER | | | | | | | |
|---|---|---|---|---|---|---|---|---|---|---|---|---|---|---|---|---|
| | b15 | b14 | b13 | b12 | b11 | b10 | b9 | b8 | b7 | b6 | b5 | b4 | b3 | b2 | b1 | b0 |
| 1 | 0 | 0 | 0 | 0 | 0 | 1 | 0 | 0 | 0 | 0 | 0 | 0 | 0 | 0 | 1 | 0 |
| 2 | 0 | 0 | 0 | 0 | 0 | 1 | 0 | 1 | 0 | 0 | 0 | 0 | 0 | 0 | 1 | 1 |
| 3 | 1 | 0 | 0 | 0 | 0 | 0 | 1 | 0 | 1 | 0 | 0 | 0 | 0 | 1 | 0 | 0 |
| 4 | 1 | 0 | 0 | 0 | 0 | 0 | 1 | 1 | 1 | 0 | 0 | 0 | 0 | 1 | 0 | 1 |
| 5 | 0 | 0 | 0 | 0 | 0 | 0 | 0 | 0 | 0 | 0 | 0 | 0 | 0 | 0 | 0 | 0 |
| 6 | 0 | 0 | 0 | 0 | 0 | 0 | 0 | 0 | 0 | 0 | 0 | 0 | 0 | 0 | 0 | 0 |
| 7 | 0 | 0 | 0 | 0 | 0 | 0 | 0 | 0 | 0 | 0 | 0 | 0 | 0 | 0 | 0 | 0 |
| .. | .. | .. | .. | .. | .. | .. | .. | .. | .. | .. | .. | .. | .. | .. | .. | .. |
| 79 | 0 | 0 | 0 | 0 | 0 | 0 | 0 | 0 | 0 | 0 | 0 | 0 | 0 | 0 | 0 | 0 |
| 80 | 0 | 0 | 0 | 0 | 0 | 0 | 0 | 0 | 0 | 0 | 0 | 0 | 0 | 0 | 0 | 0 |

FIG.18

| DATA NUMBER | INPUT NUMBER b15 | b14 | b13 | b12 | b11 | b10 | b9 | b8 | OUTPUT NUMBER b7 | b6 | b5 | b4 | b3 | b2 | b1 | b0 |
|---|---|---|---|---|---|---|---|---|---|---|---|---|---|---|---|---|
| 1 | 1 | 0 | 0 | 0 | 0 | 0 | 1 | 0 | 0 | 0 | 0 | 0 | 0 | 0 | 1 | 0 |
| 2 | 1 | 0 | 0 | 0 | 0 | 0 | 1 | 1 | 0 | 0 | 0 | 0 | 0 | 0 | 1 | 1 |
| 3 | 0 | 0 | 0 | 0 | 0 | 1 | 0 | 0 | 1 | 0 | 0 | 0 | 0 | 1 | 0 | 0 |
| 4 | 0 | 0 | 0 | 0 | 0 | 1 | 0 | 1 | 1 | 0 | 0 | 0 | 0 | 1 | 0 | 1 |
| 5 | 0 | 0 | 0 | 0 | 0 | 0 | 0 | 0 | 0 | 0 | 0 | 0 | 0 | 0 | 0 | 0 |
| 6 | 0 | 0 | 0 | 0 | 0 | 0 | 0 | 0 | 0 | 0 | 0 | 0 | 0 | 0 | 0 | 0 |
| 7 | 0 | 0 | 0 | 0 | 0 | 0 | 0 | 0 | 0 | 0 | 0 | 0 | 0 | 0 | 0 | 0 |
| .. | .. | .. | .. | .. | .. | .. | .. | .. | .. | .. | .. | .. | .. | .. | .. | .. |
| 79 | 0 | 0 | 0 | 0 | 0 | 0 | 0 | 0 | 0 | 0 | 0 | 0 | 0 | 0 | 0 | 0 |
| 80 | 0 | 0 | 0 | 0 | 0 | 0 | 0 | 0 | 0 | 0 | 0 | 0 | 0 | 0 | 0 | 0 |

FIG.20

| INPUT NUMBER | OUTPUT NUMBER | | | | | | |
|---|---|---|---|---|---|---|---|
| | b6 | b5 | b4 | b3 | b2 | b1 | b0 |
| 1 | 0 | 0 | 0 | 0 | 0 | 0 | 0 |
| 2 | 0 | 0 | 0 | 0 | 0 | 0 | 1 |
| 3 | 0 | 0 | 0 | 0 | 0 | 0 | 0 |
| 4 | 0 | 0 | 0 | 0 | 0 | 1 | 0 |
| 5 | 0 | 0 | 0 | 0 | 0 | 1 | 1 |
| 6 | 0 | 0 | 0 | 0 | 0 | 0 | 0 |
| 7 | 0 | 0 | 0 | 0 | 0 | 0 | 0 |
| ⋮ | ⋮ | ⋮ | ⋮ | ⋮ | ⋮ | ⋮ | ⋮ |
| 79 | 0 | 0 | 0 | 0 | 0 | 0 | 0 |
| 80 | 0 | 0 | 0 | 0 | 0 | 0 | 0 |

FIG.21

| TS NUMBER | INPUT NUMBER b15 | b14 | b13 | b12 | b11 | b10 | b9 | b8 | OUTPUT NUMBER b7 | b6 | b5 | b4 | b3 | b2 | b1 | b0 |
|---|---|---|---|---|---|---|---|---|---|---|---|---|---|---|---|---|
| 1 | 0 | 0 | 0 | 0 | 0 | 0 | 1 | 0 | 0 | 0 | 0 | 0 | 0 | 0 | 0 | 1 |
| 2 | 0 | 0 | 0 | 0 | 0 | 1 | 0 | 0 | 0 | 0 | 0 | 0 | 0 | 0 | 1 | 0 |
| 3 | 0 | 0 | 0 | 0 | 0 | 1 | 0 | 1 | 0 | 0 | 0 | 0 | 0 | 0 | 1 | 1 |
| 4 | 1 | 0 | 0 | 0 | 0 | 0 | 1 | 1 | 1 | 0 | 0 | 0 | 1 | 0 | 0 | 1 |
| 5 | 0 | 0 | 0 | 0 | 0 | 0 | 0 | 0 | 0 | 0 | 0 | 0 | 0 | 0 | 0 | 0 |
| 6 | 0 | 0 | 0 | 0 | 0 | 0 | 0 | 0 | 0 | 0 | 0 | 0 | 0 | 0 | 0 | 0 |
| 7 | 0 | 0 | 0 | 0 | 0 | 0 | 0 | 0 | 0 | 0 | 0 | 0 | 0 | 0 | 0 | 0 |
| .. | .. | .. | .. | .. | .. | .. | .. | .. | .. | .. | .. | .. | .. | .. | .. | .. |
| 79 | 0 | 0 | 0 | 0 | 0 | 0 | 0 | 0 | 0 | 0 | 0 | 0 | 0 | 0 | 0 | 0 |
| 80 | 0 | 0 | 0 | 0 | 0 | 0 | 0 | 0 | 0 | 0 | 0 | 0 | 0 | 0 | 0 | 0 |

FIG.22

| DATA NUMBER | INPUT NUMBER | | | | | | | | OUTPUT NUMBER | | | | | | | |
|---|---|---|---|---|---|---|---|---|---|---|---|---|---|---|---|---|
| | b15 | b14 | b13 | b12 | b11 | b10 | b9 | b8 | b7 | b6 | b5 | b4 | b3 | b2 | b1 | b0 |
| 1 | 0 | 0 | 0 | 0 | 0 | 0 | 1 | 0 | 0 | 0 | 0 | 0 | 0 | 0 | 0 | 1 |
| 2 | 1 | 0 | 0 | 0 | 0 | 0 | 1 | 1 | 0 | 0 | 0 | 0 | 0 | 0 | 1 | 0 |
| 3 | 0 | 0 | 0 | 0 | 0 | 1 | 0 | 0 | 0 | 0 | 0 | 0 | 0 | 0 | 1 | 1 |
| 4 | 0 | 0 | 0 | 0 | 0 | 1 | 0 | 1 | 1 | 0 | 0 | 0 | 0 | 1 | 0 | 1 |
| 5 | 0 | 0 | 0 | 0 | 0 | 0 | 0 | 0 | 0 | 0 | 0 | 0 | 0 | 0 | 0 | 0 |
| 6 | 0 | 0 | 0 | 0 | 0 | 0 | 0 | 0 | 0 | 0 | 0 | 0 | 0 | 0 | 0 | 0 |
| 7 | 0 | 0 | 0 | 0 | 0 | 0 | 0 | 0 | 0 | 0 | 0 | 0 | 0 | 0 | 0 | 0 |
| .. | .. | .. | .. | .. | .. | .. | .. | .. | .. | .. | .. | .. | .. | .. | .. | .. |
| 79 | 0 | 0 | 0 | 0 | 0 | 0 | 0 | 0 | 0 | 0 | 0 | 0 | 0 | 0 | 0 | 0 |
| 80 | 0 | 0 | 0 | 0 | 0 | 0 | 0 | 0 | 0 | 0 | 0 | 0 | 0 | 0 | 0 | 0 |

FIG.28

| INPUT NUMBER | OUTPUT NUMBER | | | | | | |
|---|---|---|---|---|---|---|---|
| | b6 | b5 | b4 | b3 | b2 | b1 | b0 |
| 1 | 0 | 0 | 0 | 0 | 0 | 0 | 0 |
| 2 | 0 | 0 | 0 | 0 | 0 | 0 | 0 |
| 3 | 0 | 0 | 0 | 0 | 0 | 0 | 0 |
| 4 | 0 | 0 | 0 | 0 | 0 | 1 | 0 |
| 5 | 0 | 0 | 0 | 0 | 0 | 1 | 1 |
| 6 | 0 | 0 | 0 | 0 | 0 | 0 | 0 |
| 7 | 0 | 0 | 0 | 0 | 0 | 0 | 0 |
| ⋮ | ⋮ | ⋮ | ⋮ | ⋮ | ⋮ | ⋮ | ⋮ |
| 79 | 0 | 0 | 0 | 0 | 0 | 0 | 0 |
| 80 | 0 | 0 | 0 | 0 | 0 | 0 | 0 |

FIG.29

| TS NUMBER | INPUT NUMBER b15 | b14 | b13 | b12 | b11 | b10 | b9 | b8 | OUTPUT NUMBER b7 | b6 | b5 | b4 | b3 | b2 | b1 | b0 |
|---|---|---|---|---|---|---|---|---|---|---|---|---|---|---|---|---|
| 1 | 0 | 0 | 0 | 0 | 0 | 1 | 0 | 0 | 0 | 0 | 0 | 0 | 0 | 0 | 1 | 0 |
| 2 | 0 | 0 | 0 | 0 | 0 | 1 | 0 | 1 | 0 | 0 | 0 | 0 | 0 | 0 | 1 | 1 |
| 3 | 1 | 1 | 0 | 0 | 0 | 0 | 1 | 0 | 1 | 0 | 0 | 0 | 0 | 1 | 0 | 0 |
| 4 | 1 | 0 | 0 | 0 | 0 | 0 | 1 | 1 | 1 | 0 | 0 | 0 | 0 | 1 | 0 | 1 |
| 5 | 0 | 0 | 0 | 0 | 0 | 0 | 0 | 0 | 0 | 0 | 0 | 0 | 0 | 0 | 0 | 0 |
| 6 | 0 | 0 | 0 | 0 | 0 | 0 | 0 | 0 | 0 | 0 | 0 | 0 | 0 | 0 | 0 | 0 |
| 7 | 0 | 0 | 0 | 0 | 0 | 0 | 0 | 0 | 0 | 0 | 0 | 0 | 0 | 0 | 0 | 0 |
| .. | .. | .. | .. | .. | .. | .. | .. | .. | .. | .. | .. | .. | .. | .. | .. | .. |
| 79 | 0 | 0 | 0 | 0 | 0 | 0 | 0 | 0 | 0 | 0 | 0 | 0 | 0 | 0 | 0 | 0 |
| 80 | 0 | 0 | 0 | 0 | 0 | 0 | 0 | 0 | 0 | 0 | 0 | 0 | 0 | 0 | 0 | 0 |

FIG.30

| DATA NUMBER | INPUT NUMBER / OUTPUT NUMBER |||||||||||||||| 
|---|---|---|---|---|---|---|---|---|---|---|---|---|---|---|---|---|
| | b15 | b14 | b13 | b12 | b11 | b10 | b9 | b8 | b7 | b6 | b5 | b4 | b3 | b2 | b1 | b0 |
| 1 | 1 | 0 | 0 | 0 | 0 | 0 | 1 | 0 | 0 | 0 | 0 | 0 | 0 | 0 | 1 | 0 |
| 2 | 1 | 0 | 0 | 0 | 0 | 0 | 1 | 1 | 0 | 0 | 0 | 0 | 0 | 0 | 1 | 1 |
| 3 | 0 | 0 | 0 | 0 | 0 | 1 | 0 | 0 | 1 | 0 | 0 | 0 | 0 | 1 | 0 | 0 |
| 4 | 0 | 0 | 0 | 0 | 0 | 1 | 0 | 1 | 1 | 0 | 0 | 0 | 0 | 1 | 0 | 1 |
| 5 | 0 | 0 | 0 | 0 | 0 | 0 | 0 | 0 | 0 | 0 | 0 | 0 | 0 | 0 | 0 | 0 |
| 6 | 0 | 0 | 0 | 0 | 0 | 0 | 0 | 0 | 0 | 0 | 0 | 0 | 0 | 0 | 0 | 0 |
| 7 | 0 | 0 | 0 | 0 | 0 | 0 | 0 | 0 | 0 | 0 | 0 | 0 | 0 | 0 | 0 | 0 |
| .. | .. | .. | .. | .. | .. | .. | .. | .. | .. | .. | .. | .. | .. | .. | .. | .. |
| 79 | 0 | 0 | 0 | 0 | 0 | 0 | 0 | 0 | 0 | 0 | 0 | 0 | 0 | 0 | 0 | 0 |
| 80 | 0 | 0 | 0 | 0 | 0 | 0 | 0 | 0 | 0 | 0 | 0 | 0 | 0 | 0 | 0 | 0 |

TRANSMISSION METHOD AND NODE DEVICE

CROSS-REFERENCE TO RELATED APPLICATIONS

This application is based upon and claims the benefit of priority of the prior Japanese Patent Application No. 2012-077866, filed on Mar. 29, 2012, the entire contents of which are incorporated herein by reference.

FIELD

The embodiment discussed herein is related to a transmission method and a node device.

BACKGROUND

In a network field, the ITU-T recommends the Optical Transport Network (OTN) where packet-based data may be integrally handled as a technique of a next-generation transportation having applications expected to be expanded.

In the OTN, it is possible to integrally handle TDM-based data and packet-based data, the TDM-based data being used in, for example, Synchronous Optical Network/Synchronous Digital Hierarchy (SONET/SDH), and the packet-based data being used in, for example, Ethernet (registered trademark, hereinafter simply referred to as a "LAN").

In a specification of the OTN, an Optical Channel Data Unit flex (ODUflex) is described which provides a variable bandwidth in accordance with a demand to increase the efficiency of the transmission of the packet-based data which are the current main traffic.

In the ODUflex, it is possible to flexibly increase the bandwidth. However, in an OTN where multi-stage cross-connections are arranged, a byte array may change during demapping.

To overcome such a problem, there is a proposed technique where when two ODU0s are used in a transmission path and one of the two ODU0s is then removed, the ODU path is replaced (reconfigured) while control is performed that outputs a signal to a remaining ODU path, the signal being the same as that to be output to the removed ODU path.

For related art, reference may be made to Japanese Laid-open Patent Publication No. 2011-176619.

SUMMARY

According to an aspect, a transmission method for transmitting a lower-speed signal transmission frame using a node device in a network by accommodating the lower-speed signal transmission frame into time slots of a higher-speed signal transmission frame includes supplying, when a number of the time slots accommodating the lower-speed signal transmission frame is to be increased, the time slots to input numbers of a cross-connection part of the node device in accordance with an order of time slot numbers of the time slots; and re-establishing cross-connections where the input numbers are cross-connected to corresponding output numbers of the cross-connection part so that the cross-connections are prevented from crossing each other, wherein the input numbers input the time slots and the output numbers output the time slots.

The object and advantage of the invention will be realized and attained by means of the elements and combinations particularly pointed out in the claims.

It is to be understood that both the foregoing general description and the following detailed description are exemplary and explanatory and are not restrictive of the invention as claimed.

BRIEF DESCRIPTION OF DRAWINGS

FIG. 4 illustrates example data transmitting in TS#1 and TS#3;
FIGS. 6A through 6C illustrate example data transmitting in TS#1, TS#2, and TS#3;
FIG. 7 illustrates another example bandwidth increase of ODUflex;
FIG. 12 illustrates another example data transmitting in TS#1, TS#2, and TS#3;
FIG. 15 illustrates an example configuration of an intermediate node according to a second embodiment;
FIG. 16 illustrates example cross-connection pair information;
FIG. 17 illustrates example TS additional information;
FIG. 18 illustrates an example replacement management table;
FIG. 20 illustrates another example cross-connection pair information;
FIG. 21 illustrates another example TS additional information;
FIG. 22 illustrates another example replacement management table;
FIG. 28 illustrates another example cross-connection pair information;
FIG. 29 illustrates another example TS additional information;
FIG. 30 illustrates another example replacement management table.

DESCRIPTION OF EMBODIMENT

Even with the use of the ODU path replacement technique in the related art, there may occur a problem that a byte array changes and transmission information is lost in demapping the ODUflex.

According to an embodiment, it may become possible to provide error control in a transmission order in bandwidth increase.

In the following, embodiments are described with reference to the accompanying drawings.

Frame Format

Figure 1:
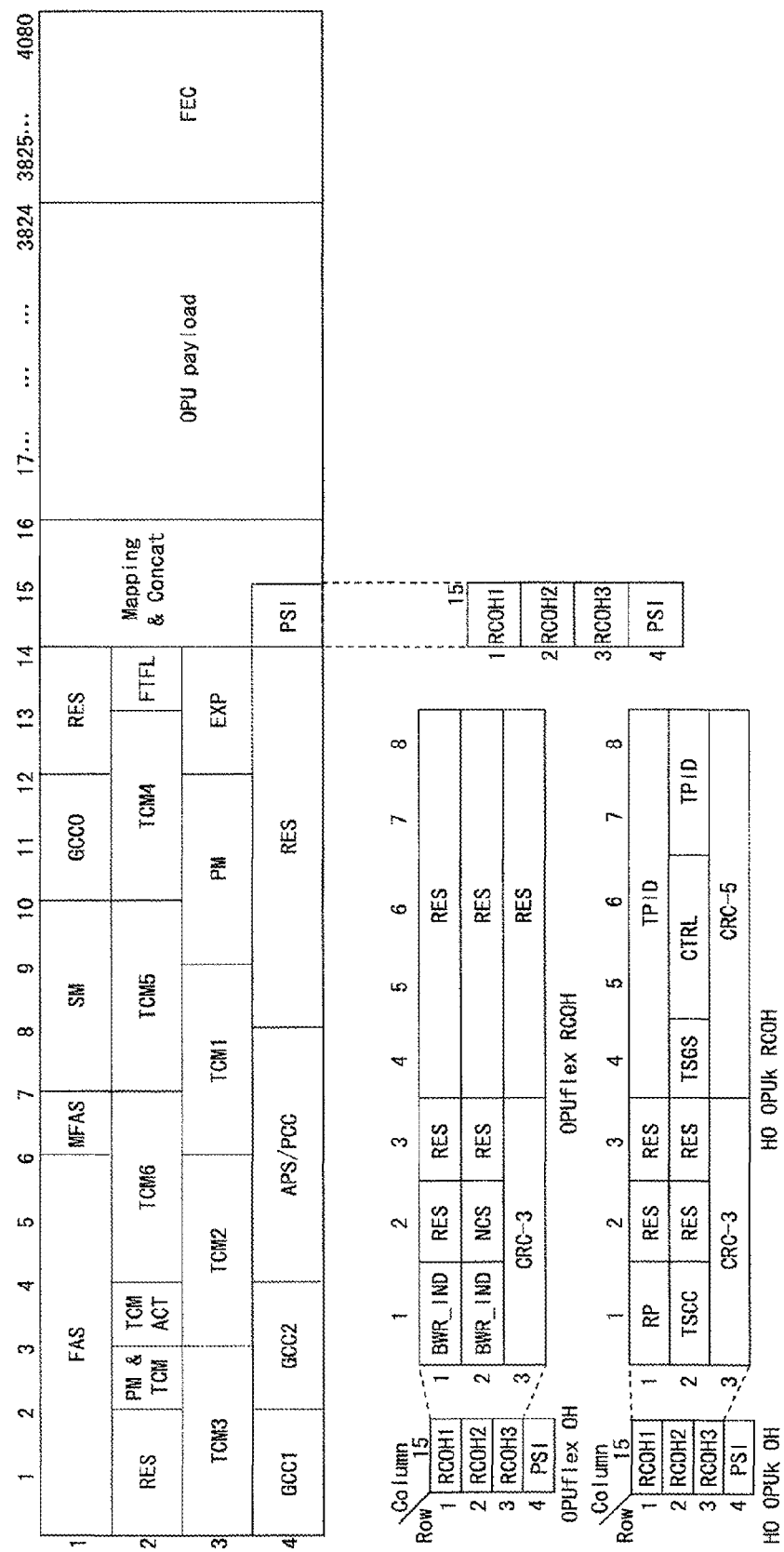
FIG. 1 illustrates an example OTUk frame format.

FIG. 1 illustrates an example frame format of an Optical channel Transport Unit k (OTUk, k: zero or a positive integer). As illustrated in FIG. 1, the OTUk frame includes an overhead section, an Optical channel Payload Unit (OPU) payload section, and a Forward Error Correction (FEC) section.

The overhead section includes 16 columns (1st to 16th columns) (16 bytes) by 4 rows and is used for connections and quality management. An array of 7 columns (1st to 7th columns) by 1 row (1st row) is a Frame Alignment (FA) overhead. An array of 7 columns (8th to 14th columns) by 1 row (1st row) is an OTU overhead. An array of 14 columns (1st to 14th columns) by three rows (2nd to 4th rows) is an ODU overhead.

An array of 2 columns (15th and 16th) by 4 rows (1st to 4th rows) is an OPU overhead (mapping and control section). An array of 1 column (15th column) by 4 rows (1st to 4th rows) is an OPUflex overhead. The OPU payload section includes 3808 columns (17th to 3824th columns) (3808 bytes) by 4 rows (1st to 4th rows). The FEC section includes 256 columns (3825th to 4080th columns) (256 bytes) by 4 rows (1st to 4th rows) and is used for correcting an error occurred in transmission.

The combination of an overhead used for connections and quality management and an OPUk payload section is called an Optical channel Data Unit (ODUk). Further, a combination of an overhead used for such as frame synchronization, connections, and quality management, an OTUkFEC overhead, and the ODUk is called an OYUk. The format of the ODUflex is the same as the ODU format.

Here, an ODUflex frame accommodating a client signal such as the Ethernet (registered trademark) is called a Lower order ODUflex (LO_ODUflex). Further, a higher-speed ODU frame accomodating multiple lower-speed LO_ODUflex frames and LO_ODU frames is called a High Order ODU (HO_ODU). Further, the LO_ODUflex frame and the LO_ODU frame may also be called a lower-speed signal transmission frame, and the HO_ODU frame may also be called a higher-speed signal transmission frame.

The multiple accommodations of the ODUflex frame into the HO_ODUk may be achieved by defining Tributary Slots (TSs) which are formed by dividing an Optical channel Payload Unit 'k' (OPUk) which is the payload part of the HO_ODUk frame into "ts" pieces, and accommodating the ODUks into the TSs of the payload area of the HO_ODUk frame.

ITU-T G.7.9 recommends defining two types of Tributary Slots having bandwidths of approximately 1.25 Gbps and approximately 2.5 Gbps, respectively, per single TS. In the case where the bandwidth for one Tributary Slot is approximately 1.25 Gbps, the number of Tributary Slots "ts" is defined to be 2 (ts=2) with respect to the HO_ODU1, is defined to be 8 (ts=8) with respect to the HO_ODU2, is defined to be 32 (ts=32) with respect to the HO_ODU3, and is defined to be 80 (ts=80) with respect to the HO_ODU4.

Further, the Tributary Slot may also be called a time slot. The Tributary Slot accommodation number (i.e., the number of accommodated Tributary Slots) "ts" may also be called the time slot accommodation number (i.e., the number of accommodated time slots). The TS number identifying the tributary slot may also be called the time slot number.

The bandwidth of the ODUflex is determined by the TS. The increase/decrease of the TS is controlled by using Resize Control Overhead (RCOH)1, RCOH2, RCOH3 of the HO_OPUk overhead. In FIG. 1, the symbol "RP" of the RCOH1 denotes a Resizing Protocol. The symbol "TPID (Tributary Port ID)" of the RCOH1 and the RCOH2 denotes a number of tributary slots to be increased/decreased.

The symbol "TSGS (Tributary Slot Group Status)" of the RCOH2 denotes a response to start the increase/decrease of the bandwidth of the ODUflex. The symbol "CTRL (ConTRoL)" denotes the control of an increase/decrease state of the TS. The symbol "TSCC (Tributary Slot Connectivity Check)" denotes a state where the bandwidth of the ODUflex is changed.

Example of OTN

In a case of the transmission of the LO_ODUflex in the OTN where multiple cross-connections by the TS are arranged, when the Tributary Slot (TS) is added to the link of the HO_ODU with the increase of the bandwidth, if the TS is simply added to a vacant TS, the transmission order between the added TS and an existing TS in use may be wrongly transmitted in passing through the cross-connections.

Figure 2:
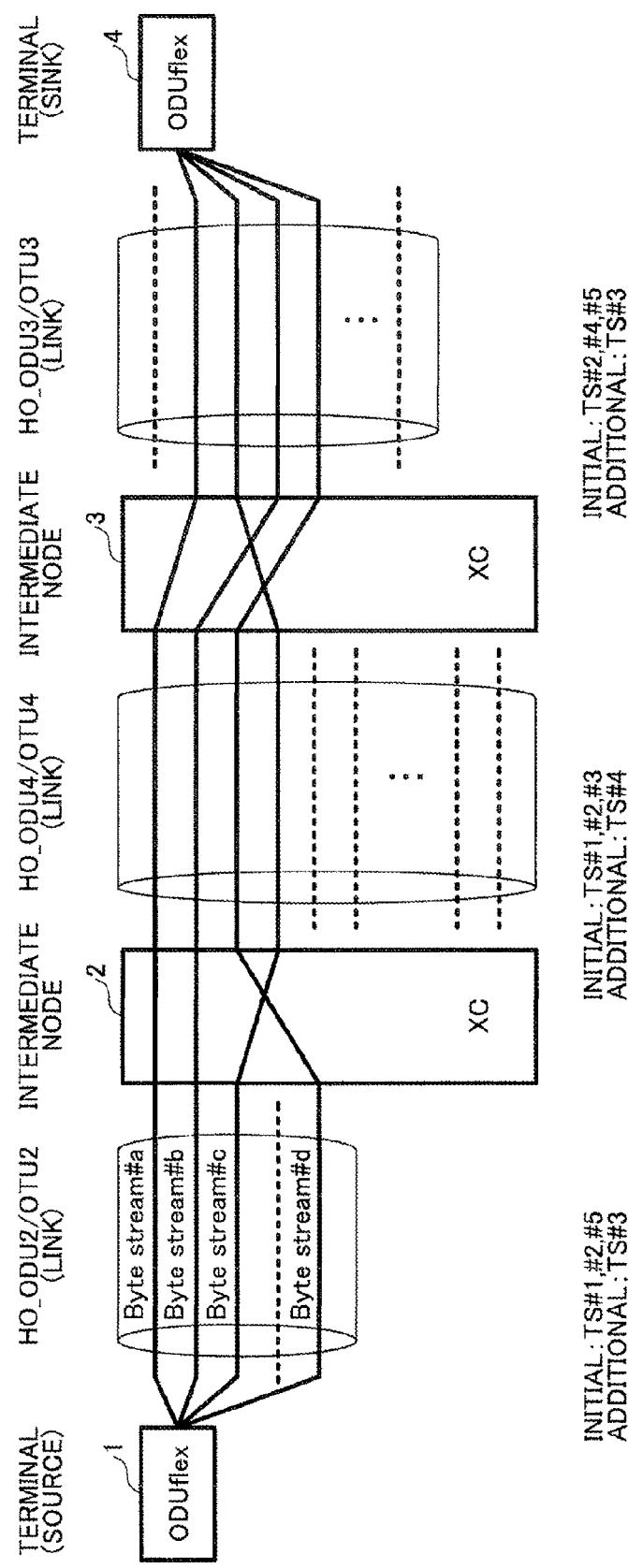
FIG. 2 illustrates an example configuration of an OTN.

FIG. 2 illustrates an example configuration of the OTN. As illustrated in FIG. 2, in the initial setting, a node 1 on the source side allocates the TS#1, TS#2, and TS#5 to the LO-ODUflex signal, and transmits the LO-ODUflex signal to an intermediate node 2.

The TS#1, TS#2, and TS#5 refer to the first, the second, and the fifth, respectively, TSs of the HO_ODU2. After that, the node 1 adds the ODUflex signal to the TS#3 in a hitless manner where there is no cut off in the transmission data. The TS#3 refers to the third TS of the HO_ODU2. Then, a mapping is performed in the order of the TS#1, #2, #3, and #5 of the HO_OUD2 (i.e., in the TS number order), so that the byte streams in the order of #a, #b, #c, and #d are transmitted to the intermediate node 2.

In the initial setting, the intermediate node 2 sequentially allocates the TS#1, #2, and #5 of the HO_ODU2 to the TS#1, #2, and #3, respectively, of the HO_ODU4, and transmits the byte streams to an intermediate node 3. After that, the intermediate node 2 cross-connects the TS#3 of the HO_ODU3 to the TS#4 of the HO_ODU4, the TS#3 of the HO_ODU3 having been added in the hitless manner.

In this case, the cross-connection between the TS#3 of the HO_ODU2 and the TS#4 of the HO_ODU4 crosses the existing cross-connection between the TS#5 of the HO_ODU2 and the TS#3 of the HO_ODU4. Further, the mapping is performed in the order of the TS#1, #2, #3, and #4 of the HO_ODU4, so as to transmit the byte streams to the intermediate node 3 in the order of the #a, #b, #c, and #d. Namely, a transmission order error occurs in the intermediate node 2.

In the initial setting, the intermediate node 3 allocates the TS#1, #2, and #3 of the HO_ODU4 to the TS#2, #4, and #5, respectively, of the HO_ODU3, and transmits the byte streams to a node 4 on the sink side. After that, the intermediate node 3 cross-connects an added TS#4 of the HO_ODU4 to the TS#3 of the HO_ODU3.

The cross-connection between the TS#4 of the HO_ODU4 and the TS#3 of the HO_ODU3 crosses the existing cross-connection between the TS#2 and #3 of the HO_ODU4 and the TS#4 and #5 of the HO_ODU3. Then, the mapping is performed in the order of the TS#2, #3, #4, and #5, so that the byte streams in the order of the #a, #b, #c, and #d are transmitted to the node 4. Namely, a transmission order error occurs in the intermediate node 3. As described above, in the example of FIG. 2, an error occurs in the transmission order.

Embodiment, Before Increase of Bandwidth

Figure 3:
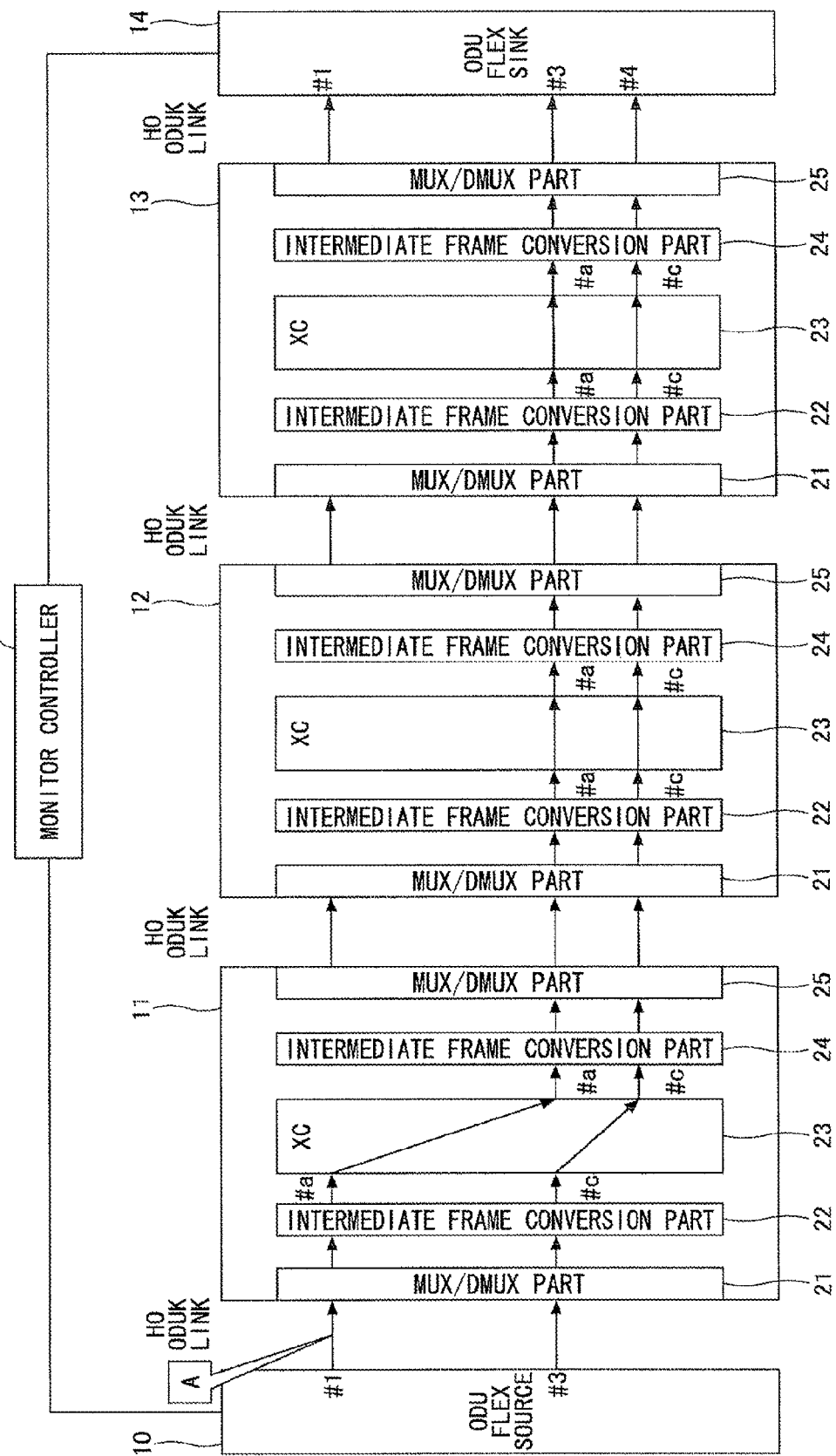
FIG. 3 illustrates an example configuration of the OTN according to an embodiment.

FIG. 3 illustrates an example configuration of the OTN according to an embodiment. As illustrated in FIG. 3, a source node 10 of the LO_ODUflex is connected to an intermediate node 11 with an HO_ODUk link. Further, the intermediate node 11 is connected to another intermediate node 12 with another HO_ODUk link.

Further, the intermediate node 12 is connected to a sink node 14 with another HO_ODUk link. Further, the source node 10 and the sink node 14 are mutually connected to a monitor controller 15. Hereinafter, the intermediate nodes 11 through 13 may be called a "node device" or "node".

The intermediate nodes 11 through 13 are cross-connection devices and include MUX/DMUX parts 21 and 25, intermediate frame conversion parts 22 and 24, and a cross-connection part (XC) 23.

The MUX/DMUX parts 21 and 25 terminate an optical signal of the HO_OTUk supplied from the HO_ODUk link, extract the HO_ODUIk signal, separate the LO_ODUk signal from the extracted HO_ODUk signal, and supply the separated LO_ODUk signal to the intermediate frame conversion parts 22 and 24, respectively.

Further, the MUX/DMUX parts 21 and 25 multiplex the LO_ODUk signal supplied from the intermediate frame conversion parts 22 and 24, respectively, onto the HO_ODUk signal, generate the optical signal of the HO_OTUk based on the HO_ODUk signal, and output the generated optical signal of the HO_OTUk to the HO_ODUk links.

The intermediate frame conversion parts 22 and 24 map the LO_ODUk signals supplied from the MUX/DMUX parts 21 and 25, respectively, onto intermediate frames and supply the intermediate frames to the cross-connection part (XC) 23.

Further, the intermediate frame conversion parts 22 and 24 demap the LO_ODUk signals from the intermediate frames supplied from the cross-connection part (XC) 23, and supply the demapped LO_ODUk signals to the MUX/DMUX parts 21 and 25, respectively.

The cross-connection part (XC) 23 cross-connects the intermediate frames supplied from the intermediate frame conversion part 22, and supplies the cross-connected intermediate frames to the intermediate frame conversion part 24. In the same manner, the cross-connection part (XC) 23 cross-connects the intermediate frames supplied from the intermediate frame conversion part 24, and supplies the cross-connected intermediate frames to the intermediate frame conversion part 22.

The intermediate frame includes an overhead area and a payload area, and has sufficient size to store the ODU0. In the overhead area, Justification overhead 1 (JC1) through JC6, Frame Alignment overhead (FAS), Bit Interleaved Parity-8 (BIP-8), Concatenate Indication (CI), and an Alarm Flag (AF) are set.

In FIG. 3, it is assumed that the cross-connection part (XC) 23 of the intermediate nodes 11 through 13 may set data #1 through #4 along with input numbers (e.g., input port numbers) and output numbers (e.g., output port numbers). In the intermediate node 11, data #a are input as the data of an input number #1, and data #c are input as the data of an input number #3. After the cross-connection, the data #a are output as the data of an output number #3, and the data #c are output as the data of an output number #4.

In the intermediate nodes 12 and 13, the data #a are input as the data of the input number #3 and the data #c are input as the data of the input number #4. After the cross-connection, the data #a are output as the data of the output number #3, and the data #c are output as the data of the output number #4.

Figure 5:
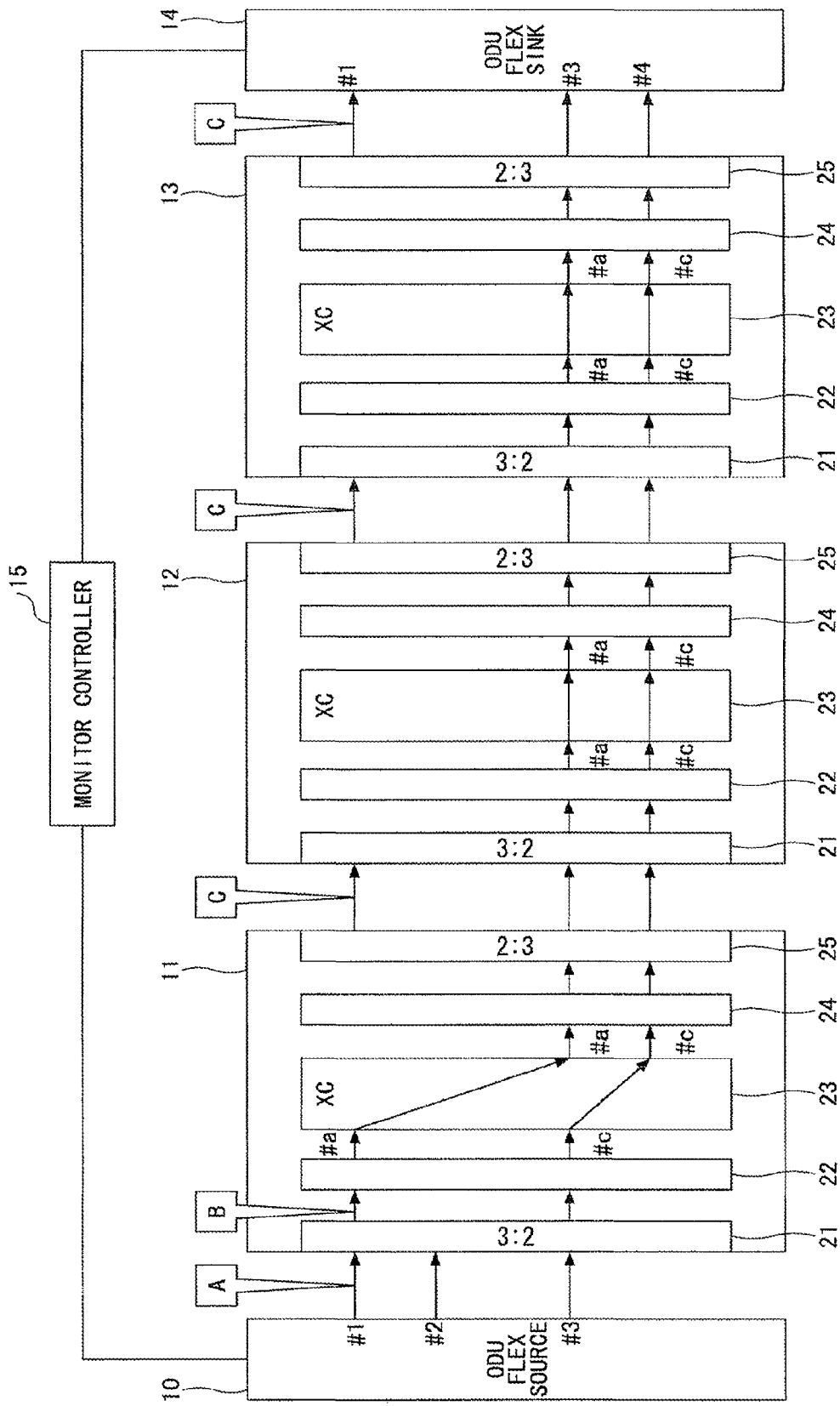
FIG. 5 illustrates example bandwidth increase of ODUflex.

In this case, at point "A" (i.e., between the source node 10 and the intermediate node 11) in FIG. 5, the data DT1 through DT20 are transmitted in the order as illustrated in FIG. 4 by using the TS#1 and #3 of the ODUflex corresponding to the input numbers #1 and #3.

Occurrence of Bandwidth Increase Request

Upon a request of increasing the bandwidth of the LO_ODUflex, the source node 10 of the LO_ODUflex communicates with the sink node 14 and the intermediate nodes 11 through 13 based on a Link Connection Resize (LCR) protocol or a BandWidth connection Resize (BWR) protocol, so that the nodes add the TS of the HO_ODU.

As illustrated in FIG. 5, the source node 10 increases the bandwidth of the ODUflex by adding the TS #2 to the TS #1 and #3 (i.e., the TS changes from #1 and #3 to #1, #2, and #3). In this case, in between the source node 10 and the intermediate 11, data DT1 through DT15 are transmitted in the order illustrated in FIG. 6A using the TS#1, #2, and #3. At this moment, a cross-connection setting of the intermediate node 11 is not changed yet. Therefore, even after the increase by adding the TS#2, the data amount in FIG. 6A is still the same as that in FIG. 4.

Therefore, the MUX/DMUX part 21 of each the intermediate nodes 11 through 13 performs n:m conversion. Here, "n" denotes the number of TSs after the TS is added, and "m" denotes the number of TSs before the TS is added. By doing this, at point "B" (i.e., between the MUX/DMUX parts 21 and the intermediate frame conversion part 22 of the intermediate node 11), a state is changed into a state of using the TS#1 and #3 as illustrated in FIG. 6B. The state of FIG. 6B is the same as that of FIG. 4. Further, a cross-connection state before the addition of the TS is maintained.

Next, the MUX/DMUX part 25 of each of the intermediate nodes 11 through 13 performs m:n conversion. By doing this, at the points "C" (i.e., between adjacent two intermediate nodes and between the intermediate node 13 and the sink node 14), a state is changed into a state of using the TS#1, #2, and #3 as illustrated in FIG. 6C. In this point of view, the state of FIG. 6C is the same as that of FIG. 6A.

Next, along with the TS addition of the HO_ODU to increase the bandwidth of the ODUflex, as illustrated in FIG. 7, a setting is added to a vacant TS number (i.e. TS number not in use) at the input and output of the cross-connection part (XC) 23 of the first-stage intermediate node 11. Here, for example, the input number #2 and the output number #1 are added.

Figure 8:
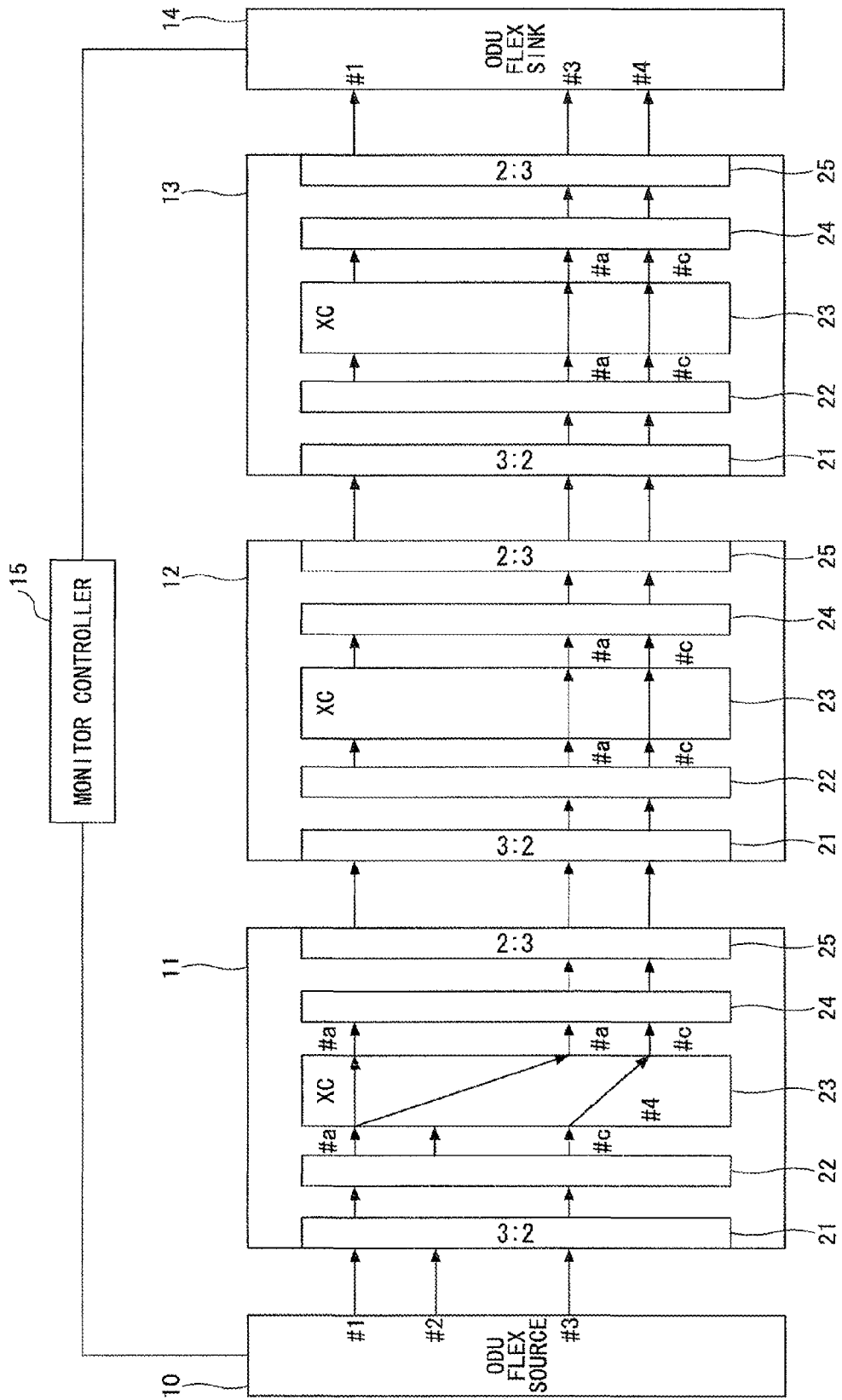
FIG. 8 illustrates another example bandwidth increase of ODUflex.

Next, to maintain the transmission order in performing the replacement (updating) of the cross-connection on the TS numbers of the added input and output of the cross-connection part (XC) 23, multicasting as illustrated in FIG. 8 is performed. Namely, in the multicast (multicast re-establishing), while maintaining the cross-connection from the input number #1 to the output number #1 already formed in the cross-connection part (XC) 23 of the intermediate node 11, a cross-connection from the input number #1 to the output number #1 is set to be effective.

By doing this, the data #a of the ODUflex is output from (the ports of) the output numbers #1 and #3. Namely, the multicast (multicast reestablishing) herein refers to a process to update the cross-connections by replacing cross-connections including cross-connections crossing each other with cross-connections including no cross-connections crossing each other.

Figure 9:
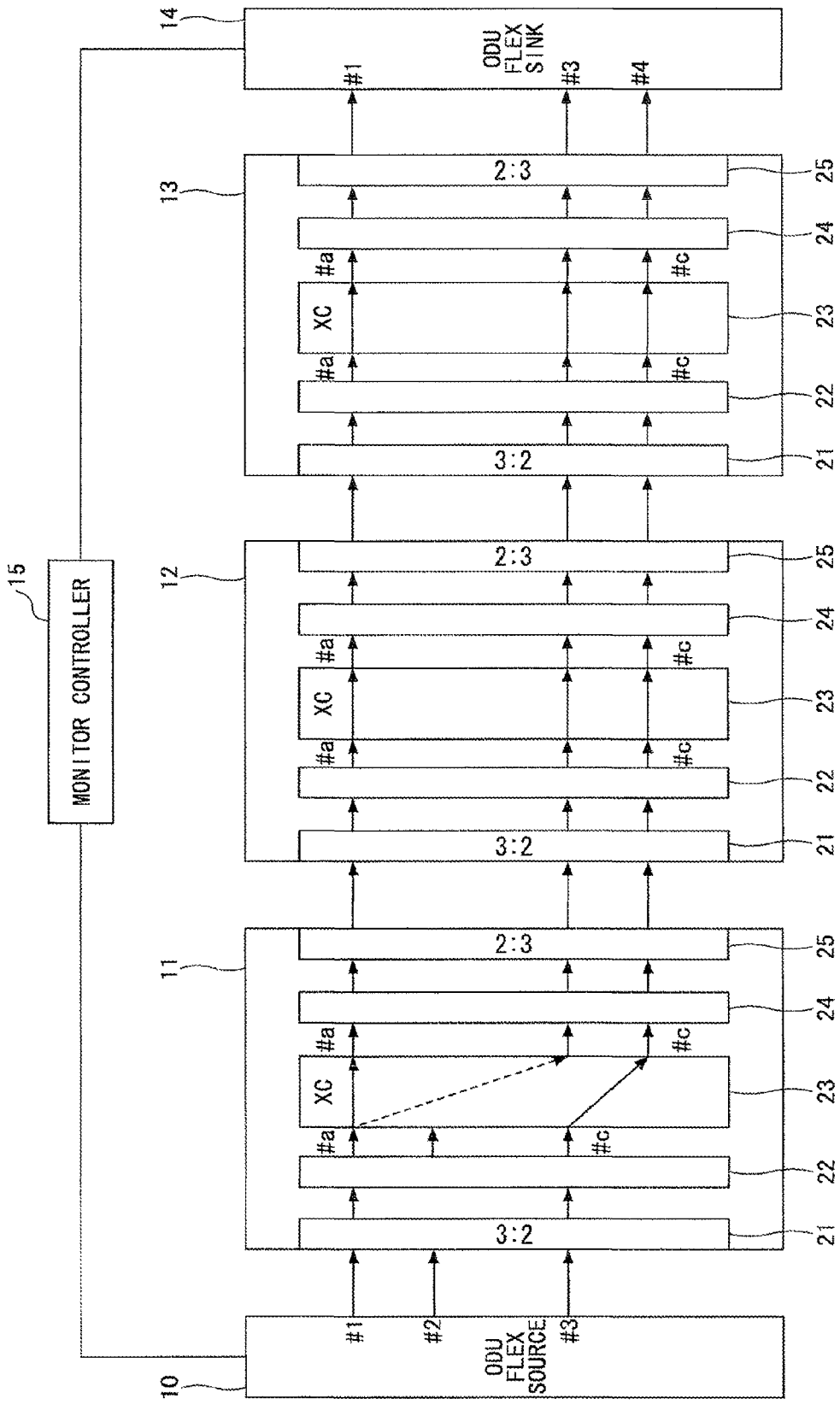
FIG. 9 illustrates another example bandwidth increase of ODUflex.

Next, as illustrated in FIG. 9, the TS cross-connection already formed before the multicast from the input number #1 to the output number #3 is removed (cancelled, disconnected).

Herein, as described above, a process of setting the cross-connections between the input number (i.e., input) and the output numbers (i.e., outputs) before and after the replacement (update) by multicast, cancelling (releasing) the cross-connection between the input number (input) and the output number (output) before the replacement, and setting the cross-connection between the input number and the output number after the replacement may be called "multicast replacement".

Herein, the input number and output number may be, for example, an input port and an output port, respectively.

Further, the intermediate node 11 instructs the cross-connection part (XC) 23 of the intermediate nodes 12 and 13 disposed on the downstream side of the cross-connection part (XC) 23 of the intermediate node 11 to replace the setting so as to use the output data from the output number #1 after the multicast, the cross-connection parts (XC) having performed the multicast using the LCR protocol or the like.

Figure 10:
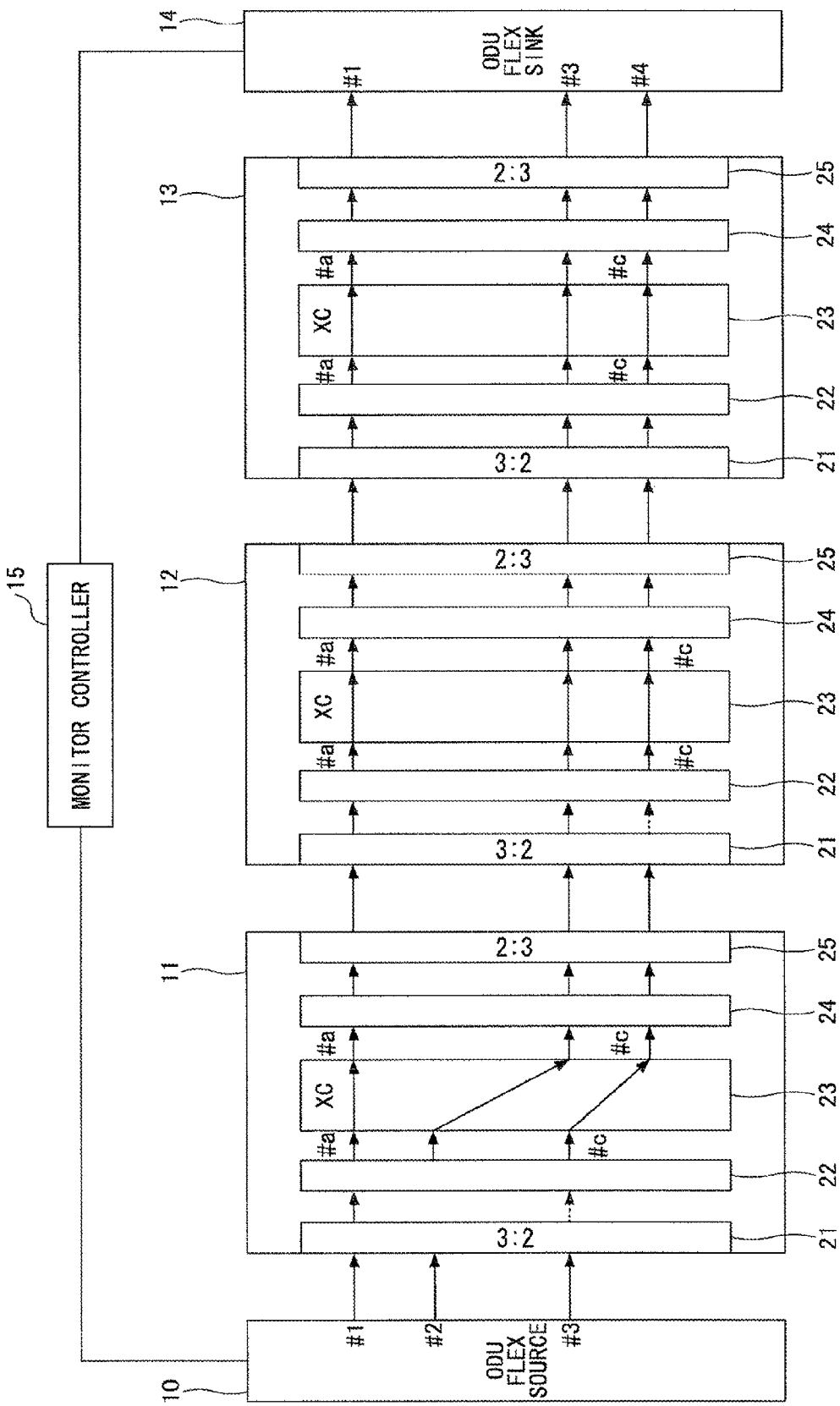
FIG. 10 illustrates another example bandwidth increase of ODUflex.

Next, as illustrated in FIG. 10, in the cross-connection part (XC) 23 of the intermediate node 11, the multicast replacement is performed by cross-connecting the input number #2 which has not been a target of the multicast and the output number #3.

Figure 11:
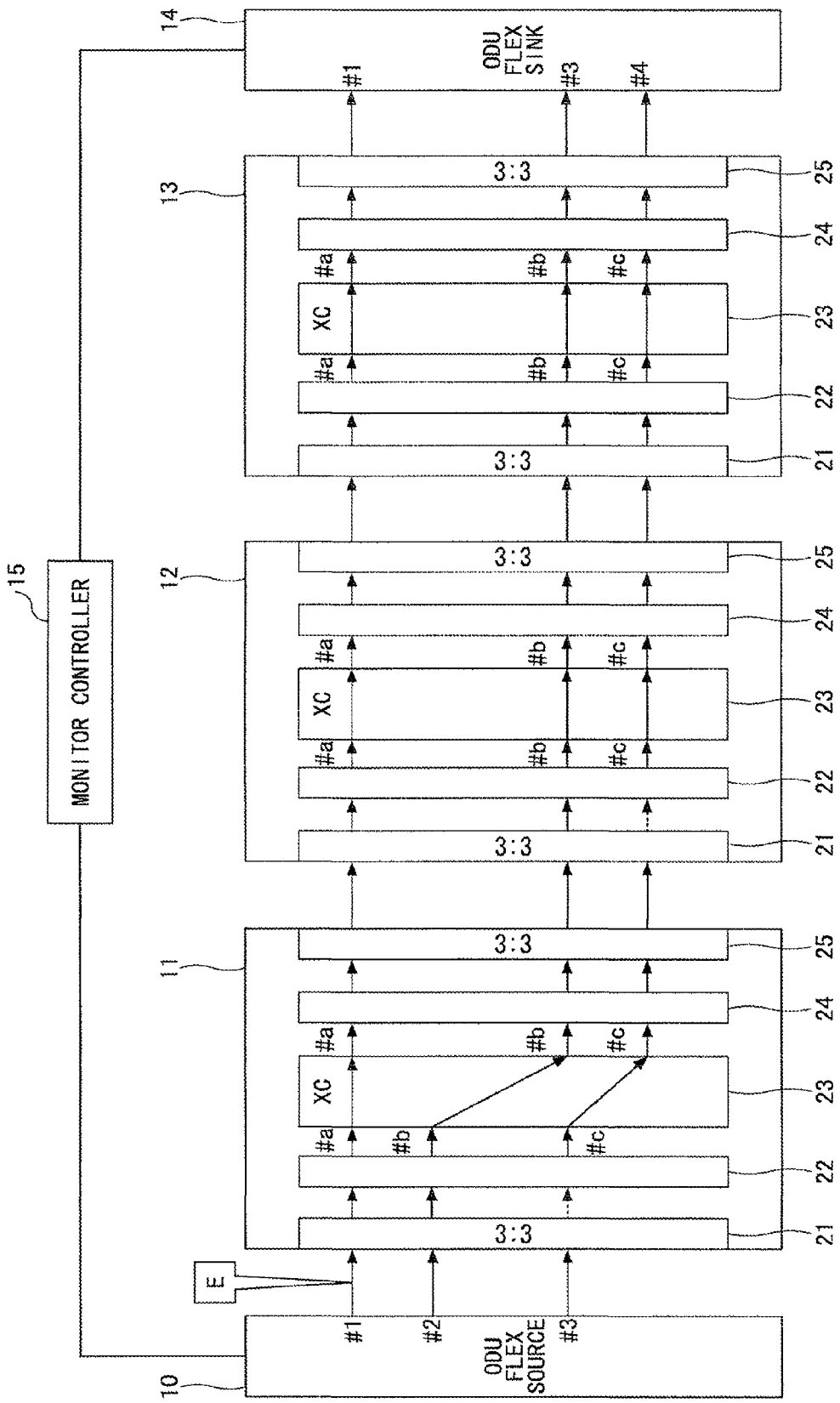
FIG. 11 illustrates another example bandwidth increase of ODUflex.

Next, as illustrated in FIG. 11, in response to an instruction from the intermediate node 11 using the LCR protocol, the intermediate nodes 12 and 13 separately replace the cross-connections in their cross-connection parts (XC) 23 based on the transmission order.

After the replacement of the nth cross-connection, by changing from the n:m conversion or the m:n conversion into n:n conversion in the MUX/DMUX parts 21 and 25 of the intermediate nodes 11 through 13, the preparation of the TS addition of the HO_ODU that maintains the transmission order may be completed.

After that, the intermediate node 11 reports the completion of the preparation of the TS addition to the source node 10 using the LCR protocol.

By doing this, in between the source node 10 and the intermediate node 11, the data DT1 through DT30 are transmitted in the order illustrated in FIG. 12 using the TS#1, #2, and #3. In FIG. 12, the data amount is increased compared to that in FIG. 6A.

Configuration of Intermediate Node

Figure 13:
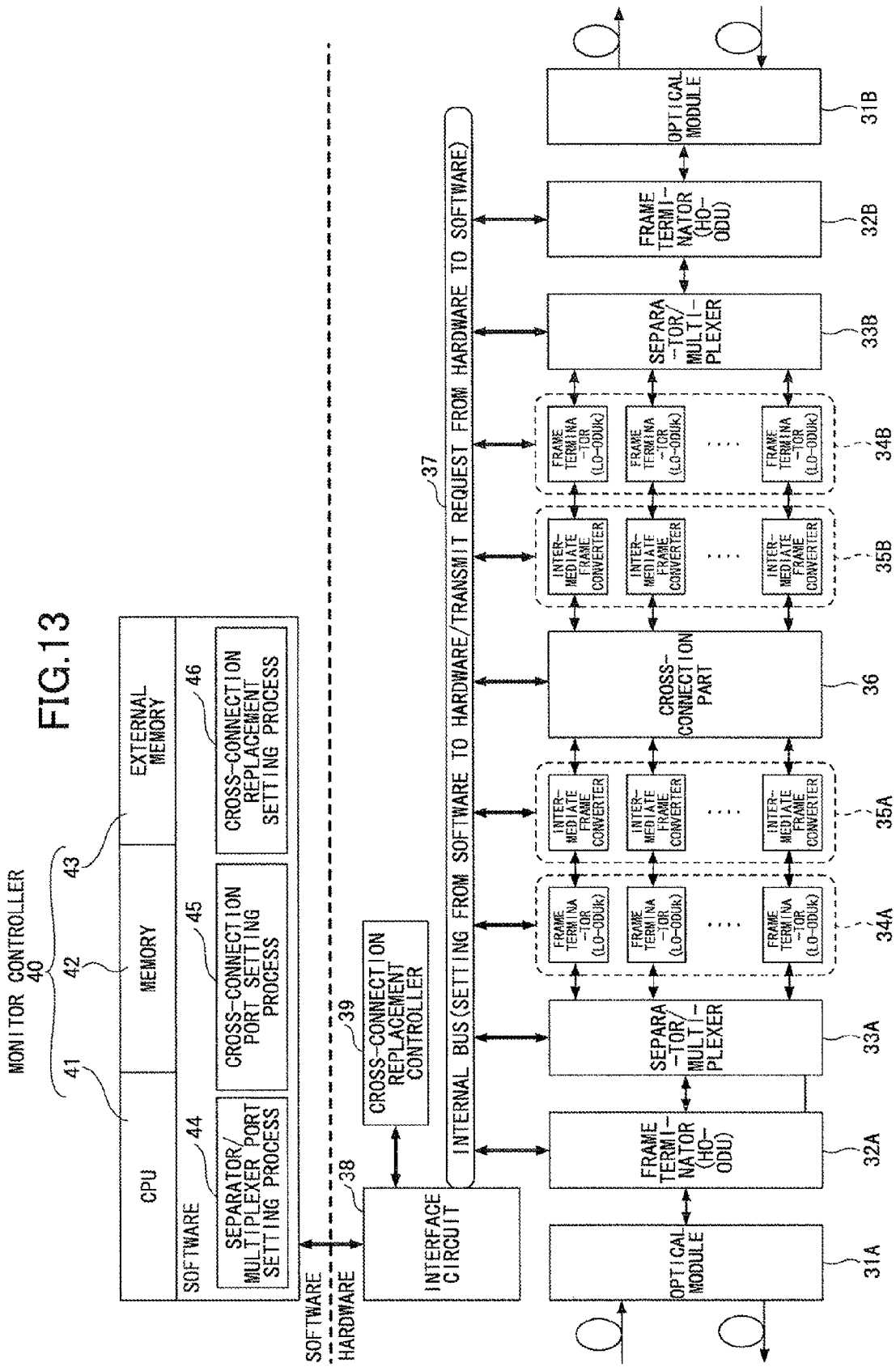
FIG. 13 illustrates an example configuration of an intermediate node according to a first embodiment.

FIG. 13 illustrates an example configuration of the intermediate node according to a first embodiment. In FIG. 13, an optical module 31A converts an optical signal received from the HO_ODUk link into an electrical signal, and supplies the electrical signal to a frame terminator 32A.

Further, the optical module 31A converts the electrical signal from the frame terminator 32A into an optical signal, and outputs the optical signal to the HO_ODUk link.

The frame terminator 32A terminates the HO_OTUk frame, extracts the HO_ODUk frame, and supplies the extracted HO_ODUk frame to a separator/multiplexer 33A. Further, the frame terminator 32A generates the HO_OTUk frame based on the HO_ODUk frame supplied from the separator/multiplexer 33A, and supplies the generated HO_OTUk frame to the optical module 31A.

The separator/multiplexer 33A separates the LO_OTUk frame and the LO_OTUflex frame from the HO_ODUk frame, and supplies the separated frames to a frame terminator 34A.

Further, the separator/multiplexer 33A multiplexes the LO_OTUk frame and the LO_OTUflex frame supplied from the frame terminator 34A to generate the HO_ODUk frame, and supplies the generated HO_ODUk frame to the frame terminator 32A.

The optical module 31A, the frame terminator 32A, and the separator/multiplexer 33A correspond to the MUX/DMUX part 21 of FIG. 3.

There are plural frame terminators 34A. The frame terminator 34A terminates the LO_OTUk frame and the LO_OTUflex frame, and supplies them to an intermediate frame converter 35A as the LO_ODUk frame and the LO_ODUflex frame.

Further, the frame terminator 34A generates the LO_OTUk frame and the LO_OTUflex frame based on the LO_ODUk frame and the LO_ODUflex frame supplied from the intermediate frame converter 35A, and supplies the generated frames to the separator/multiplexer 33A.

There are plural intermediate frame converters 35A. The intermediate frame converter 35A converts the LO_OTUk frame and the LO_OTUflex frame into intermediate frames, and supplies the intermediate frames to a cross-connection part 36.

Further, the intermediate frame converte 35A converts the intermediate frames supplied from the cross-connection part 36 to generate the LO_OTUk frame and the LO_OTUflex frame, and supplies the generated LO_OTUk frame and the LO_OTUflex frame to the frame terminator 34A. The frame terminator 34A and the intermediate frame converter 35A correspond to the intermediate frame conversion part 22.

The cross-connection part 36 performs the cross-connection on the intermediate frame supplied from the intermediate frame converter 35A, and then supplies the intermediate frame to the intermediate frame converter 35B.

Further, the cross-connection part 36 performs the cross-connection on the intermediate frame supplied from the intermediate frame converter 35B, and then supplies the intermediate frame to the intermediate frame converter 35A. The cross-connection part 36 corresponds to the cross-connection parts (XC) 23 of FIG. 3.

Further, an optical module 31B, a frame terminator 32B, a separator/multiplexer 33B, a frame terminator 34B, and an intermediate frame converter 35B are the same circuits as the optical module 31A, the frame terminator 32A, the separator/multiplexer 33A, the frame terminator 34A, and the intermediate frame converter 35A, respectively.

The frame terminators 32A and 32B, the separators/multiplexers 33A and 33B, the frame terminators 34A and 34B, and the intermediate frame converters 35A and 35B are connected to an interface circuit 38 via a bus 37. The interface circuit 38 is connected to a cross-connection replacement controller 39 and a Central Processing Unit (CPU) 41, a memory 42, and an external memory 43 as a monitor controller 40.

The CPU 41 executes a separator/multiplexer port setting process 44, a cross-connection port setting process 45, a cross-connection replacement setting process 46 and the like by executing various programs stored in the memory 42. The external memory 43 stores cross-connection setting information and the like.

By executing the separator/multiplexer port setting process 44, the ports of the separator/multiplexer 33A and 33B may be set. Further, by executing the cross-connection port setting process 45, the ports of the cross-connection part 36 may be set.

Further, by executing the cross-connection replacement setting process 46, the information to the cross-connection replacement controller 39 is set. Further, the monitor controller 40 is connected to the monitor controller 15 in the OTN.

Configuration of Cross-Connection Replacement Controller

Figure 14:
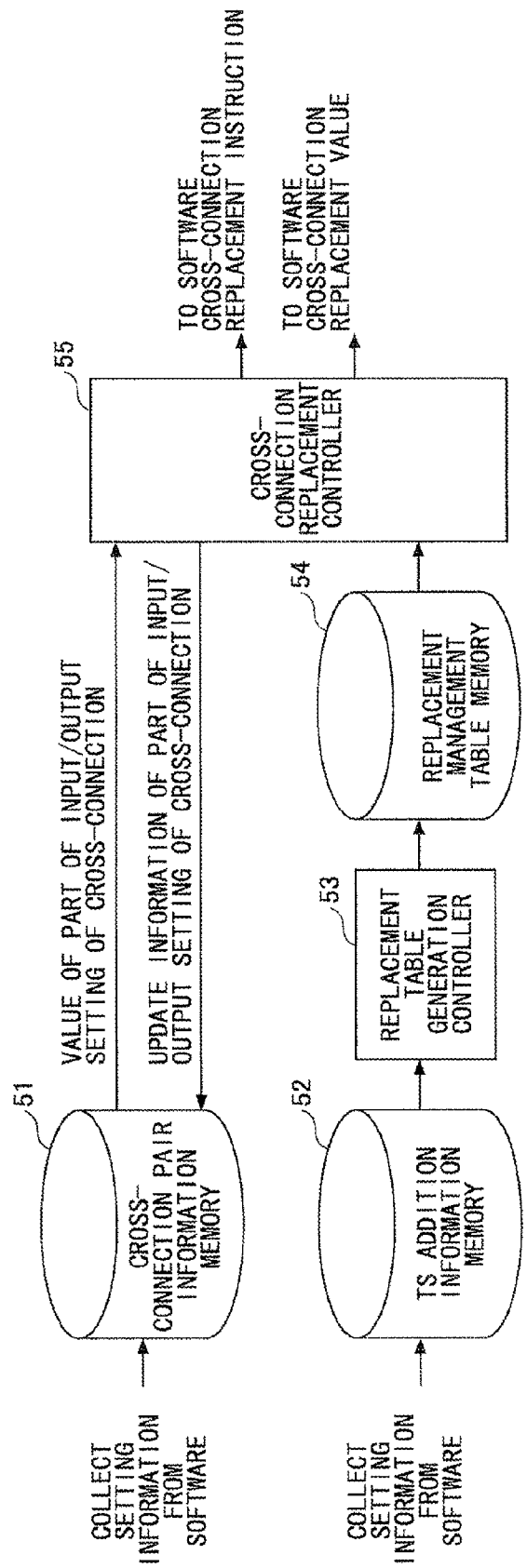
FIG. 14 illustrates an example configuration of a cross-connection replacement controller according to an embodiment.

FIG. 14 illustrates an example configuration of the cross-connection replacement controller 39 according to an embodiment. By the cross-connection replacement setting process 46, the cross-connection pair information from the external memory 43 is stored in a cross-connection pair information memory 51.

Further, by the cross-connection replacement setting process 46, the TS addition information from the external memory 43 is stored in a TS addition information memory 52.

A replacement table generation controller 53 generates a replacement management table based on the TS addition information, and stores the generated replacement management table in a replacement management table memory 54.

A cross-connection replacement controller 55 generates a cross-connection replacement instruction and a cross-connection replacement value by referring to the cross-connection pair information memory 51 and the replacement management table memory 54, and reports the generated instruction and value to the monitor controller 40.

Further, the cross-connection replacement controller 55 updates the cross-connection pair information in the cross-connection pair information memory 51.

FIG. 15 illustrates an example configuration of the intermediate node according to a second embodiment. In FIG. 15, the same reference numerals are used to describe the same elements in FIG. 13. In the configuration of FIG. 13, the cross-connection replacement control is executed by the cross-connection replacement controller 39 which is a hardware circuit.

On the other hand, in the configuration of FIG. 15, the cross-connection replacement control is executed by executing a cross-connection replacement control process 47 based on software of the monitor controller 40. Therefore, in the configuration of FIG. 15, the cross-connection replacement controller 39 is not included.

In FIG. 15, the CPU 41 executes the separator/multiplexer port setting process 44, the cross-connection port setting process 45, the cross-connection replacement control process 47 and the like by executing various programs stored in the memory 42.

Further, the functions of the cross-connection replacement control process 47 include the functions of the cross-connection replacement setting process 46.

Cross-Connection Pair Information, TS Addition Information

FIG. 16 illustrates example cross-connection pair information in the cross-connection pair information memory 51. In the rows of FIG. 16, input numbers as addresses are allocated. Further, output numbers are set to the respective input numbers having, for example, seven bits.

The cross-connection pair information in each row indicates a pair between the input number and the output number of the cross-connection set in the cross-connection part 36. For example, the fourth row of FIG. 16 indicates that the cross-connection between the input number #4 and the output number #2 is set in the cross-connection part 36.

FIG. 17 illustrates example TS addition information in the TS addition information memory 52. The TS addition information of FIG. 17 indicates which cross-connection set between input and output is used by each of the TSs of the LO_ODUflex. In the rows of FIG. 17, TS numbers are allocated as addresses.

For example, each row has 16 bits, and the data in bits 8 through 14 indicate the input number. The value "1" in bit 15 indicates that the TS is added to the input number, and value "0" in bit 15 indicates that the TS of the input number is existing already. The data in bits 0 through 6 indicate the output number.

The value "1" in bit 7 indicates that the TS is added to the output number, and value "0" in bit 7 indicates that the TS of the output number is existing already.

For example, in the first row, the first TS indicates the existing cross-connection formed from the input number #4 to the output number #2. Further, in the third row, the input number #2 and the output number #4 are added with respect to the third TS. In the fourth row, the input number #3 and the output number #5 are added with respect to the fourth TS.

FIG. 18 illustrates an example replacement management table in the replacement management table memory 54. The replacement management table of FIG. 18 is a table of the cross-connection maintaining the transmission order in consideration of the cross-connection where the TS is added. In the rows of FIG. 18, data numbers as addresses are allocated. The data numbers indicate the order of the bandwidth of the LO_ODUflex (i.e., TS numbers).

In this example, the bandwidth is 4TS. Further, the TS#1 is related to the cross-connection between the input number #2 and the output number #2, the TS#2 is related to the cross-connection between the input number #3 and the output number #3, the TS#3 is related to the cross-connection between the input number #4 and the output number #4, and the TS#4 is related to the cross-connection between the input number #5 and the output number #5.

Cross-Connection Replacement Control

Operation procedure of the cross-connection replacement controller 39 (or the cross-connection replacement control process 47) in the first-stage intermediate node 11 is described.

Conditions for the replacement of the cross-connection may differ depending on the cases where only one TS is added and where two or more TSs are added. Therefore, both of the cases are described below.

Case where one TS is added

Figure 19:
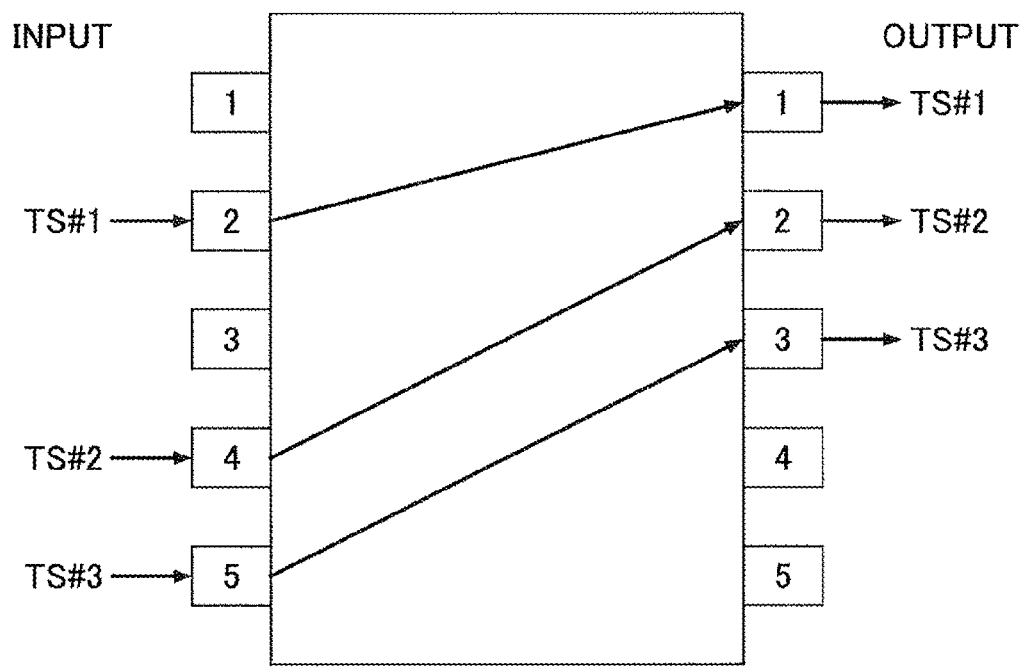
FIG. 19 illustrates an example cross-connection state before TS addition.

Cross-connection replacement is described in a case where one TS is added. FIG. 19 illustrates an example cross-connection state before the TS is added. Here, it is assumed that the cross-connection part 36 includes four inputs and four outputs. In the example of FIG. 19, as the TS#1, the cross-connection is formed from the input number #2 to the output number #1.

As the TS#2, the cross-connection is formed from the input number #4 to the output number #2. As the TS#3, the cross-connection is formed from the input number #5 to the output number #3. The cross-connection pair information in this case is described in FIG. 20.

Here, in the cross-connection replacement setting process 46, one vacant input and one vacant output in the cross-connection part 36 are added. FIG. 21 illustrates a case where, in the TS#4, the input number #3 and the output number #5 are added. Namely, the fourth row of FIG. 21 indicates that the input number #3 and the output number #5 are added with respect to the fourth TS.

The replacement table generation controller 53 generates the replacement management table that maintains the transmission order when the cross-connections are formed based on the TS addition information of FIG. 21 where the added TS described above is added.

Here, the TS addition information of FIG. 21 is divided into an input part (bits 8 through 15) and an output part (bits 0 through 7). In the input part, the data (bits 8 through 14) are arranged in the increasing order.

Figure 23:
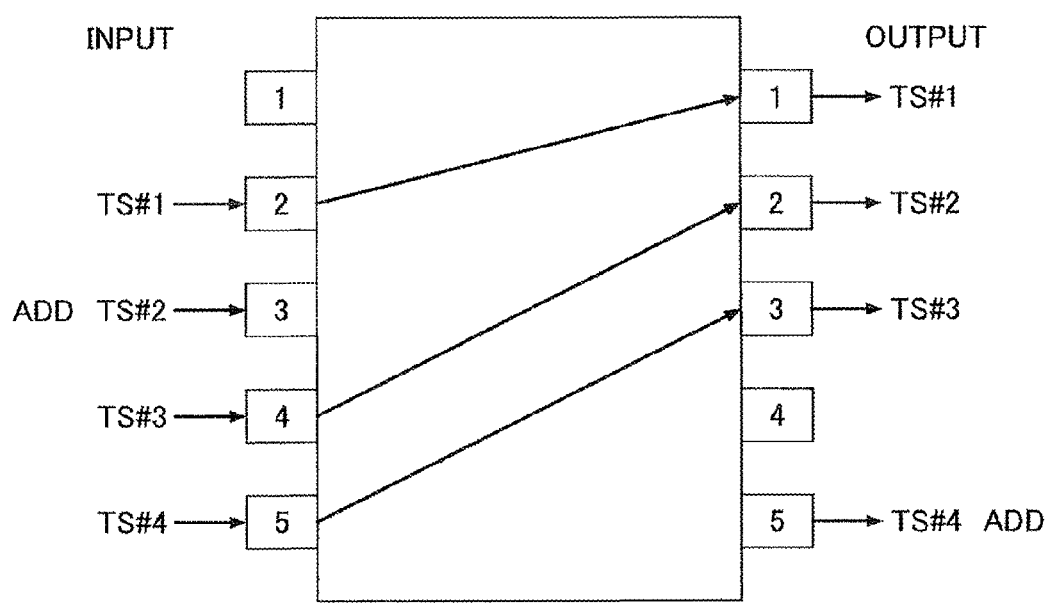
FIG. 23 illustrates an example cross-connection state.

In the output part, the data (bits 0 through 6) are arranged in the increasing order. By doing this, the replacement management table of FIG. 22 is obtained. Namely, the replacement management table of FIG. 22 indicates the cross-connection state of the cross-connection part 36 of FIG. 23

Next, an example operation of the cross-connection replacement controller 55 (or the cross-connection replacement control process 47) is described.

In step S1, the cross-connection replacement controller 55 reads the rows of the replacement management table as illustrated in FIG. 22 one by one in the increasing order.

In step S2, the cross-connection replacement controller 55 determines a priority order based on a combination of the data in bit #15 (b15) and bit #7 (b7), and outputs cross-connection replacement instructions.

Here, the "priority 1" refers to a case where the data of the bits #15 and #7 are "01" indicating a pair of existing input and additional output. In this case, the cross-connection replacement controller 55 sends a request to the cross-connection port setting process 45 to execute the replacement of the cross-connection by multicasting.

Further, the "priority 2" refers to a case where the data of the bits #15 and #7 are "00" indicating a pair of existing input and existing output. When the original TS number is the same, the cross-connection replacement controller 55 terminates by maintaining the original cross-connection state. When the original TS number is different, the cross-connection replacement controller 55 sends a request to the cross-connection port setting process 45 to execute the replacement of the cross-connection by multicasting.

Further, the "priority 3" refers to a case where the data of the bits #15 and #7 are "10" indicating a pair of additional input and existing output, or "11" indicating a pair of additional input and additional output. In this case, the cross-connection replacement controller 55 maintains and sets the current cross-connection state.

In step S2-1, based on the "priority 1", the cross-connection replacement controller 55 requests the TS#4 to execute the replacement by multicasting.

By doing this, with respect to the TS#4 of the cross-connection from the input number #5 to the output number #3, the cross-connection port setting process 45 replaces the cross-connection by multicasting (forming the cross-connections) from the input number #5 to the output numbers #3 and #5, and cancelling the cross-connection from the input number #5 to the output number #3.

Figure 24:
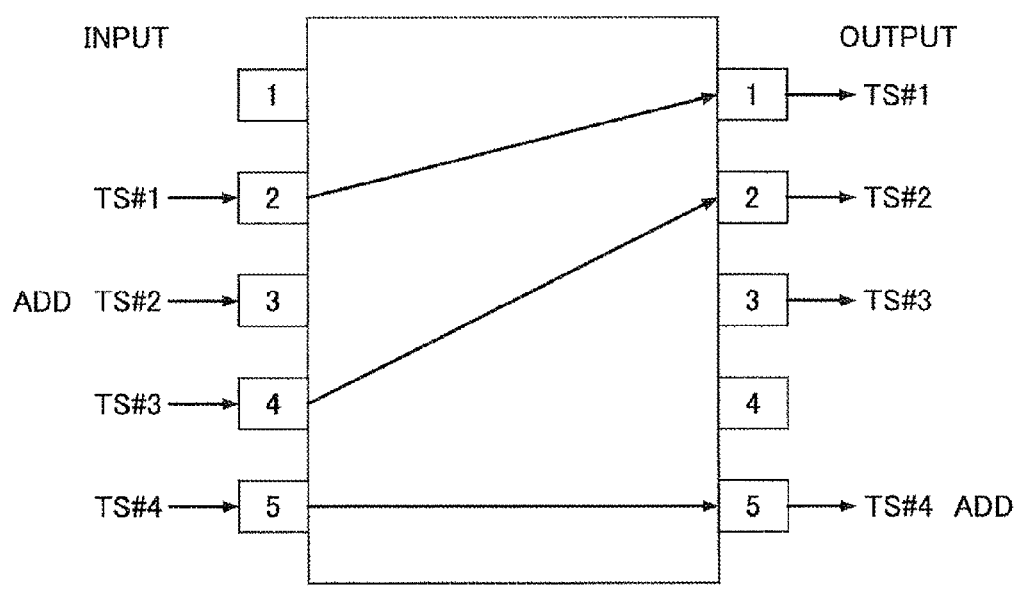
FIG. 24 illustrates another example cross-connection state.

FIG. 24 illustrates the cross-connection state of the cross-connection part 36 after the replacement described above.

In step S2-2, after confirming that there is no case of the "priority 1", the "priority 2" is checked. With respect to TS#1, the original TS number is the same. Therefore, the setting is maintained. However, with respect to TS#3, the original TS number is different. Therefore, the cross-connection replacement controller 55 sends a request to the cross-connection port setting process 45 to execute the replacement of the cross-connection by multicasting.

By doing this, with respect to the TS#3, the cross-connection port setting process 45 replaces the cross-connection by multicasting from the input number #4 to the output numbers #2 and #3, and cancels the cross-connection from the input number #4 to the output number #2.

Figure 25:
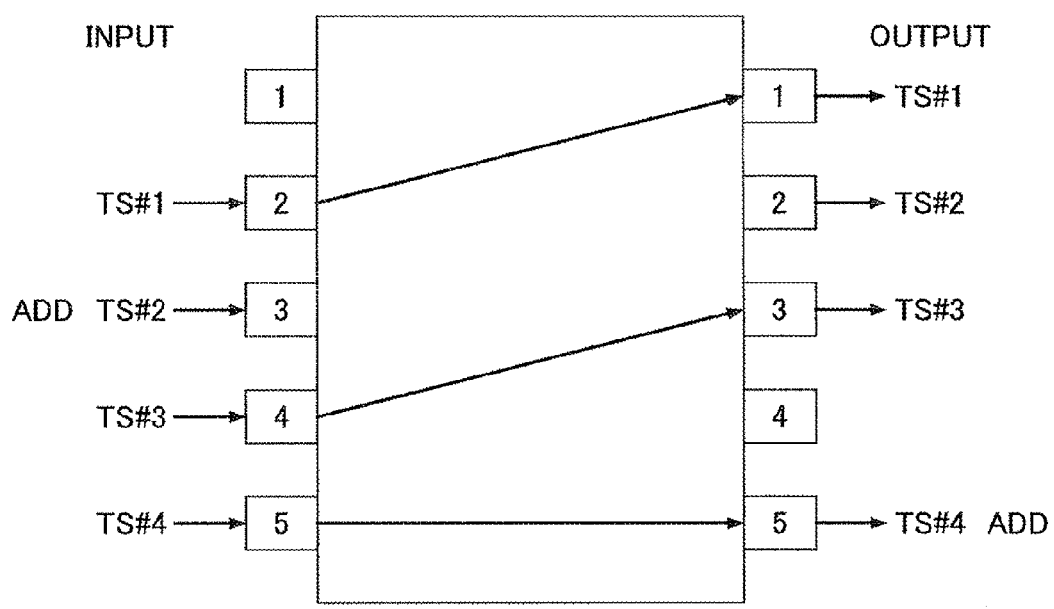
FIG. 25 illustrates another example cross-connection state.

FIG. 25 illustrates the cross-connection state of the cross-connection part 36 after the replacement described above.

In step S2-3, after confirming that there is no case of the "priority 2", the "priority 3" is checked. The cross-connection replacement controller 55 sends a request to the cross-connection port setting process 45 to execute the replacement of the cross-connection in accordance with the replacement management table.

By doing this, with respect to the TS#2, the cross-connection port setting process 45 replaces (sets) the cross-connection from the input number #3 to the output number #2.

Figure 26:
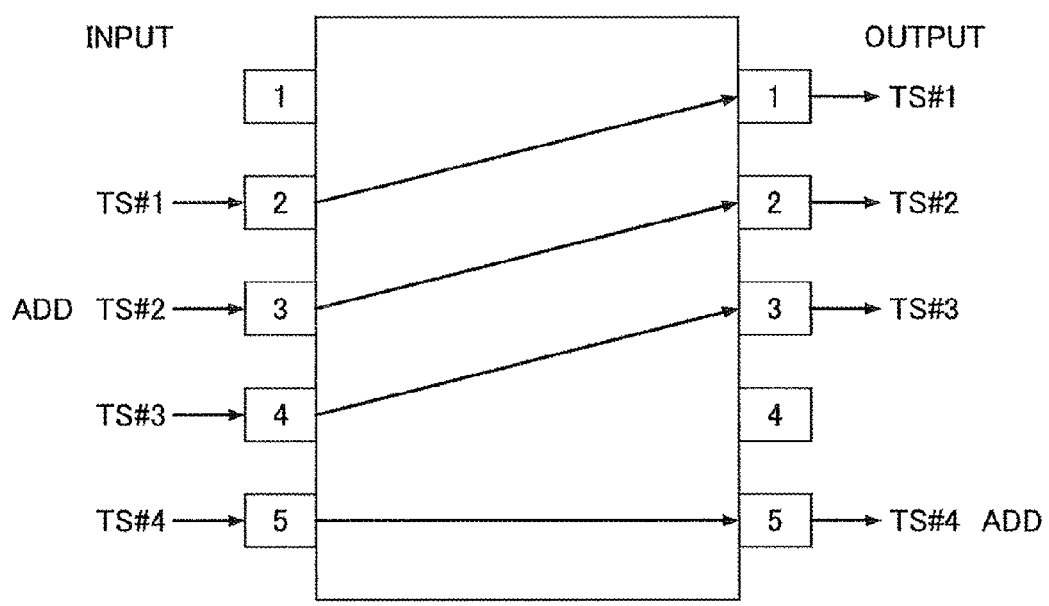
FIG. 26 illustrates another example cross-connection state.

FIG. 26 illustrates the cross-connection state of the cross-connection part 36 after the replacement described above.

In step S2-3, the replacement with respect to all the TS numbers #1, #2, #3, and #4 has completed. The cross-connection replacement controller 55 reports the completion of the replacement to the cross-connection port setting process 45.

Case where Two or More TSs are Added

Figure 27:
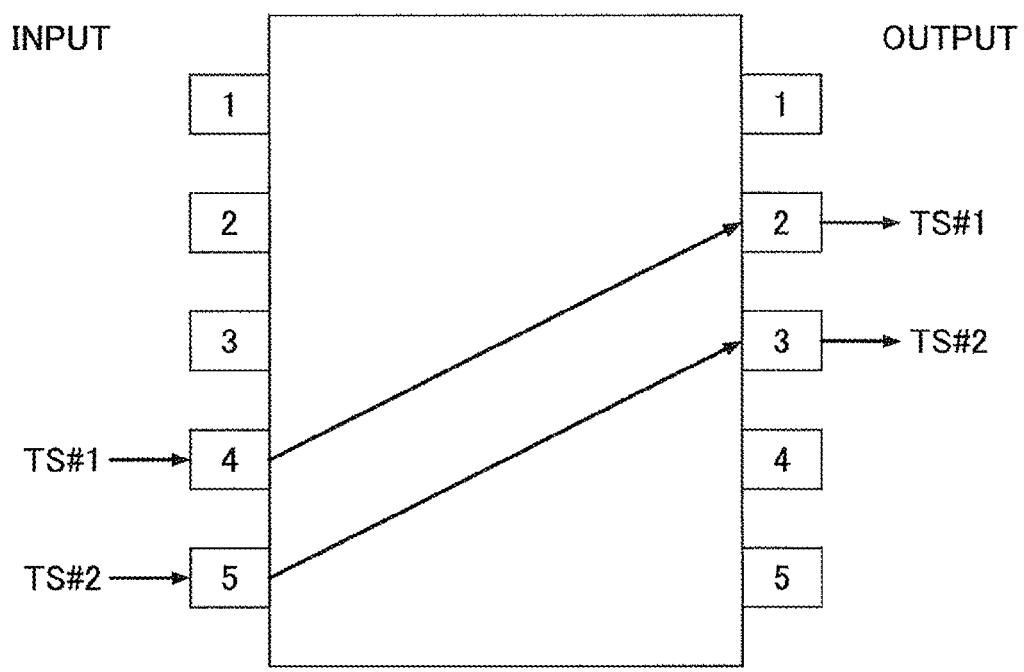
FIG. 27 illustrates another example cross-connection state before TS addition.

Cross-connection replacement is described in a case where two or more TSs are added. FIG. 27 illustrates an example cross-connection state before the TSs are added. Here, it is assumed that the cross-connection part 36 includes four inputs and four outputs.

In the example of FIG. 27, as the TS#1, the cross-connection is formed from the input number #4 to the output number #2. As the TS#2, the cross-connection is formed from the input number #5 to the output number #3. The cross-connection pair information in this case is described in FIG. 28.

Here, in the cross-connection replacement setting process 46, two vacant inputs and two vacant outputs in the cross-connection part 36 are added. FIG. 29 illustrates a case where, in the TS#3 and #4, the input numbers #2 and #3 and the output numbers #4 and #5, respectively, are added.

Namely, the third row of FIG. 29 indicates that the input number #2 and the output number #4 are added with respect to the TS#3. Further, the fourth row of FIG. 29 indicates that the input number #3 and the output number #5 are added with respect to the TS#4.

The cross-connection replacement controller 55 generates the replacement management table that maintains the transmission order when the cross-connections are formed based on the TS addition information of FIG. 29 where the added TS described above is added.

Here, the TS addition information of FIG. 29 is divided into an input part (bits 8 through 15) and an output part (bits 0 through 7). In the input part, the data (bits 8 through 14) are arranged in the increasing order.

In the output part, the data (bits 0 through 6) are arranged in the increasing order. By doing this, the replacement management table of FIG. 30 is obtained. Namely, the replacement management table of FIG. 30 indicates the cross-connection state of the cross-connection part 36 of FIG. 31.

Next, an example operation of the cross-connection replacement controller 55 (or the cross-connection replacement control process 47) is described.

In step S11, the cross-connection replacement controller 55 reads the rows of the replacement management table as illustrated in FIG. 30 one by one in the increasing order.

In step S12, the cross-connection replacement controller 55 determines the priority order based on the combination of the data in bit #15 (b15) and bit #7 (b7), and outputs the cross-connection replacement instructions.

The "priority 1" refers to the case where the data of the bits #15 and #7 are "01" indicating a pair of existing input and additional output. In this case, the cross-connection replacement controller 55 sends a request to the cross-connection port setting process 45 to execute the replacement of the cross-connection by multicasting according to the following conditions.

Figure 31:
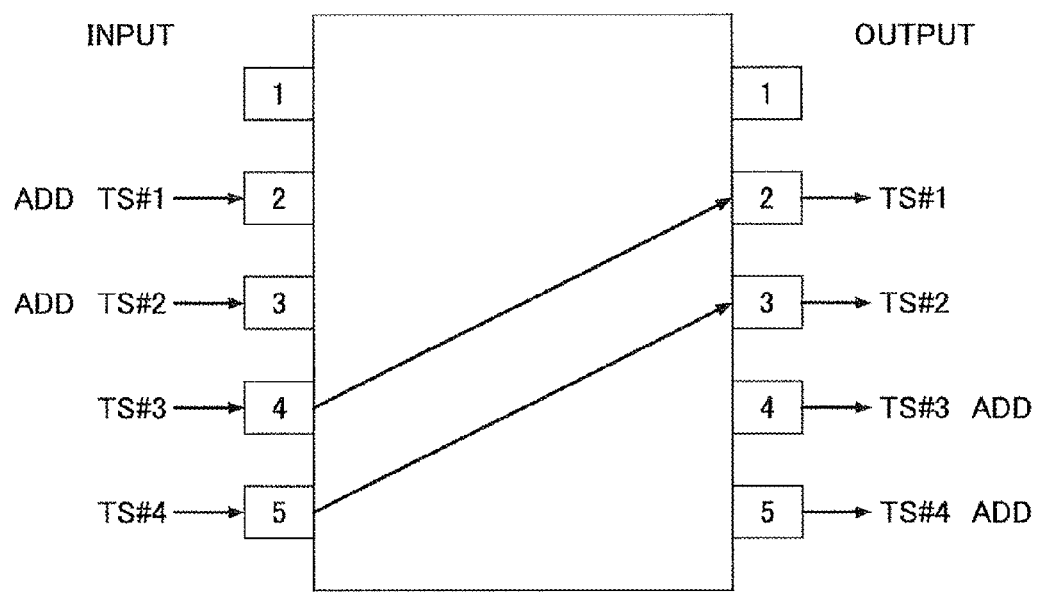
FIG. 31 illustrates another example cross-connection state.

Here, symbols "A", "B", and "C" are defined as follows: the "A" denotes a TS number (i.e., TA#"A", TS#1) of an output number (#2) connected to an input number (#4) to be used as the input number of a target TS number (e.g., TS#3 in the case of FIG. 31);

the "B" denotes a TS number (i.e., TA#"B", TS#2) of an output number (#3) connected to an input number (#5) of a TS number (TS#4) greater than the target TS number (TS#3 in the case of FIG. 31); and the "C" denotes the target TS number (TS#3).

Here, in a case of A<B<C or A>B>C, the cross-connection replacement is temporarily skipped or stopped.

This is because in the above case of A<B<C or A>B>C, if the replacement by multicasting is executed, the cross-connections may cross each other. Therefore, to avoid the occurrence of the crossing, a process is skipped. Further, when such a crossing of the cross-connection occurs, it becomes impossible to maintain the transmission order.

In a case other than the above conditions A<B<C and A>B>C, the cross-connection replacement controller 55 sends a request to the cross-connection port setting process 45 to execute the replacement of the cross-connection by multicasting.

Further, the "priority 2" refers to the case where the data of the bits #15 and #7 are "00" indicating a pair of existing input and existing output. When the original TS number is the same, the cross-connection replacement controller 55 terminates by maintaining the original cross-connection state.

When the original TS number is different, the cross-connection replacement controller 55 sends a request to the cross-connection port setting process 45 to execute the replacement of the cross-connection by multicasting.

Further, the "priority 3" refers to a case where the data of the bits #15 and #7 are "10" indicating a pair of additional input and existing output, or "11" indicating a pair of additional input and additional output. In this case, the cross-connection replacement controller 55 maintains and sets the current cross-connection state.

In step S12-1, based on the "priority 1", the cross-connection replacement controller 55 attempts to send a request to the TS#3 to execute the replacement by multicasting. However, it is in the condition A<B<C. Therefore, the process is skipped.

In step S12-2, based on the "priority 1", the cross-connection replacement controller 55 requests (causes) the TS#4 to execute the replacement by multicasting. Here, if it is in a condition other than the conditions A<B<C and A>B>C, it is not skipped.

By doing this, with respect to the TS#4 having a cross-connection from the input number #5 to the output number #3, the cross-connection port setting process 45 forms the cross-connections by multicasting from the input number #5 to the output numbers #3 and #5, and cancels the cross-connection from the input number #5 to the output number #3, so as to form the cross-connection from the input number #5 to the output number #5.

In step S12-3, after checking all the data numbers, there remains a skipped process of the "priority 1". In this case, however, the condition is not A<B<C. Therefore, the cross-connection replacement controller 55 requests (causes) the TS#3 to execute the replacement by multicasting.

By doing this, with respect to the TS#3 having a cross-connection from the input number #4 to the output number #2, the cross-connection port setting process 45 forms the cross-connections by multicasting from the input number #4 to the output numbers #2 and #4, and cancels the cross-connection from the input number #4 to the output number #2, so as to form the cross-connection from the input number #4 to the output number #4.

Figure 32:
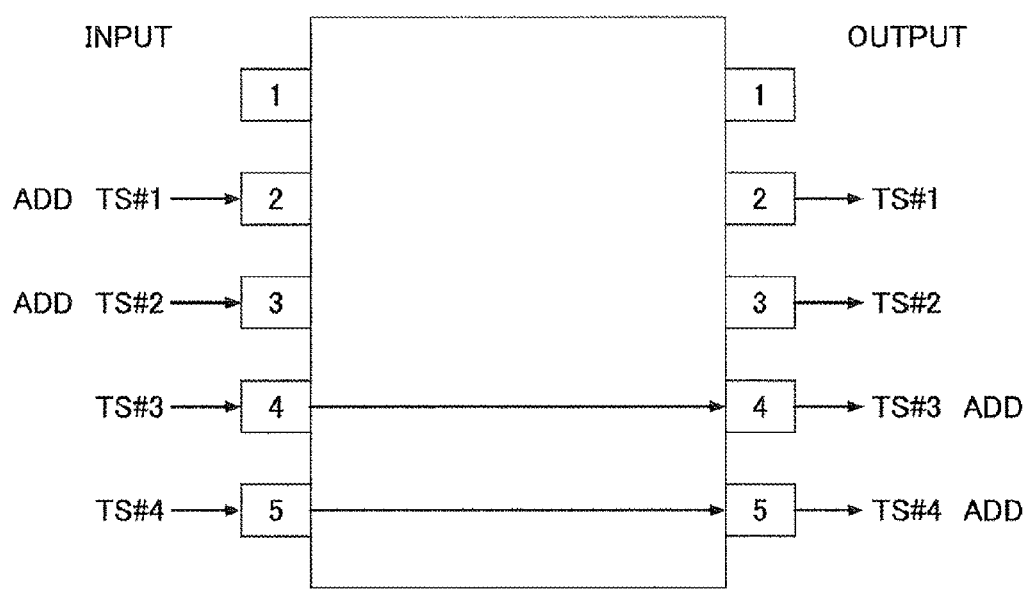
FIG. 32 illustrates another example cross-connection state.

FIG. 32 illustrates the cross-connection state of the cross-connection part 36 after the above replacement.

In step S12-4, there are no data corresponding to the "priority 2". Therefore, the "priority 3" is checked, and the cross-connection replacement controller 55 requests the cross-connection port setting process 45 to execute the cross-connection replacement based on the replacement management table.

By doing this, the cross-connection port setting process 45 replace the cross-connection to form the cross-connection from the input number #2 to the output number #2 with respect to the TS#1 and further form the cross-connection from the input number #3 to the output number #3 with respect to the TS#2.

Figure 33:
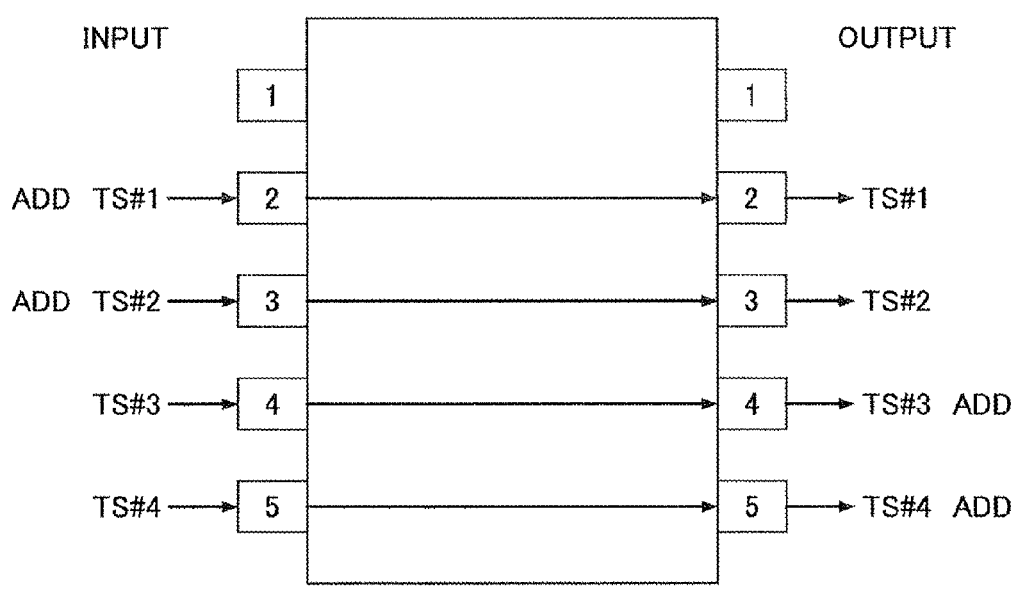
FIG. 33 illustrates another example cross-connection state.

FIG. 33 illustrates the cross-connection state of the cross-connection part 36 after the above replacement.

In step S12-5, the replacement with respect to all the TS numbers #1, #2, #3, and #4 has completed. The cross-connection replacement controller 55 reports the completion of the replacement to the cross-connection port setting process 45.

So far, the cross-connection replacement has been explained when two TSs are added. This process described above is similarly applied to the cross-connection replacement when three or more TSs are added.

OTN

Figure 34:
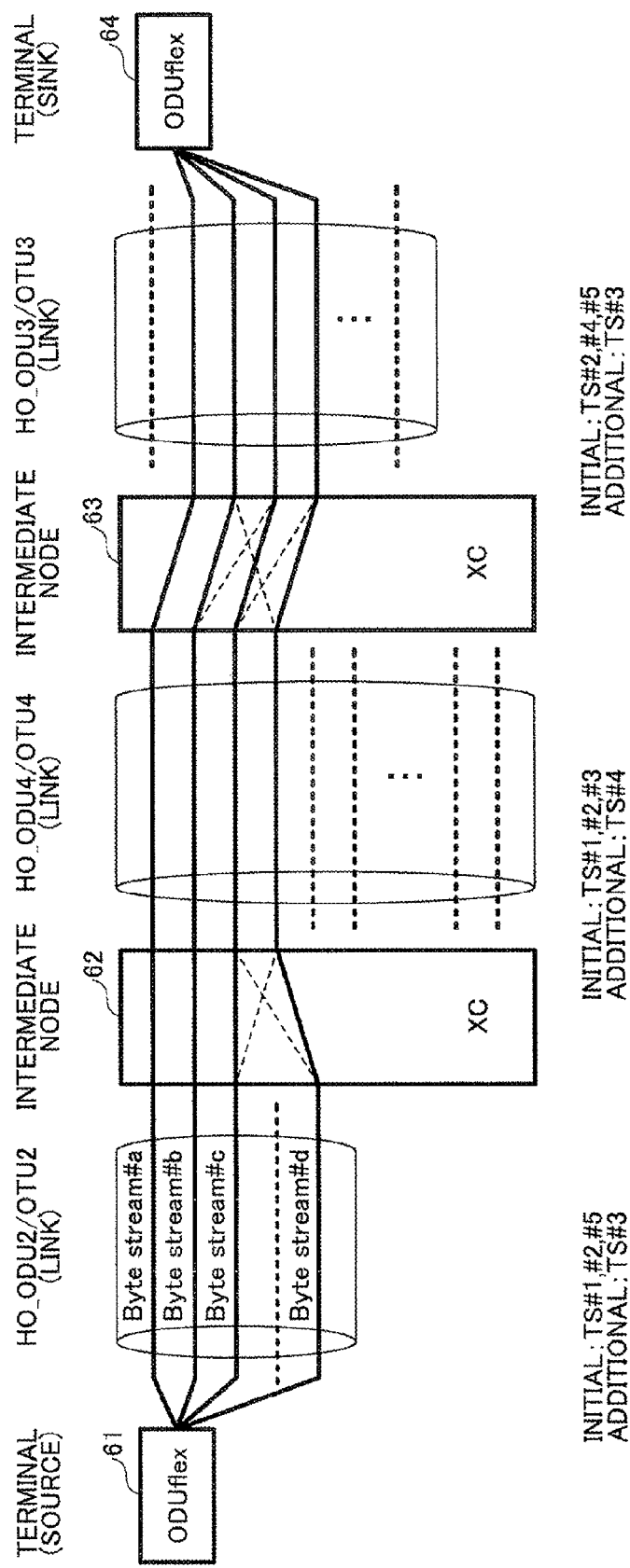
FIG. 34 illustrates an example configuration of the OTN according to an embodiment.

FIG. 34 illustrates an example configuration of the OTN according to an embodiment. In an initial setting, a node 61 on the source side allocates the LO_ODUflex signals to the TS#1, #2, and #5 corresponding to the first, second, and fifth TSs of the HO_ODU2, and transmits the signals to an intermediate node 62. After that, the node 61 adds the ODUflex signal to the TS#3, which is the third TS of the HO_ODUflex in the hitless manner where there is no cut off in the transmission data.

Then, the node 61 performs mapping in the order of the TS#1, #2, #3, and #5 of the HO_ODU2 (i.e., in the order of the TS numbers), and transmits the byte streams in the order of #a, #b, #c, and #d to the intermediate node 62.

In the initial setting, the intermediate node 62 sequentially allocates the TS#1, #2, and #5 of the HO_ODU2 to the TS#1, #2, and #3, respectively, of the HO_ODU4, and transmits the byte streams to an intermediate node 63. After that, when the TS#3 of the HO_ODU2 is added in the hitless manner, as described above, the cross-connections are replaced, so as to form the cross-connection having no crossing between the TS#1, #2, #3, and #5 of the HO_ODU2 and the TS#1, #2, #3, and #4 of the HO_ODU4.

Then the mapping is performed in the order of the TS#1, #2, #3, and #4 of the HO_ODU4, and the byte streams in the order of the #a, #b, #c, and #d are transmitted to the intermediate node 63. Namely, there is no transmission order error having occurred in the intermediate node 62.

In the initial setting, the intermediate node 63 allocates the TS#1, #2, and #3 of the HO_ODU4 to the TS#2, #4, and #5 of the HO_ODU3, and transmits the byte streams to a node 64 on the sink side.

After that, when the TS#4 of the HO_ODU4 is added in the hitless manner, as described in the above embodiment, the cross-connections are replaced so as to form the cross-connections having no crossing between the TS#1, #2, #3, and #4 of the HO_ODU4 and the TS#2, #3, #4, and #5 of the HO_ODU3. Then the mapping is performed in the order of the TS#2, #3, #4, and #5 of the HO_ODU3, and the byte streams in the order of the #a, #b, #c, and #d are transmitted to the node 64. Namely, there is no transmission order error having occurred in the node 63.

As described above, according to an embodiment, in the case of the TS addition of the HO_ODUk along with the bandwidth increase of the LO_ODUflex, it is possible to separately set the cross-connections in the intermediate nodes in a manner that the transmission order is maintained. Therefore, it becomes possible to easily manage the transmission of the LO_ODUflex between the source node and the sink node.

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that various changes, substitutions, and alterations could be made hereto without departing from the sprit and scope of the invention.

What is claimed is:

1. A transmission method for transmitting a lower-speed signal transmission frame using a node device in a network by accommodating the lower-speed signal transmission frame into time slots of a higher-speed signal transmission frame, the transmission method comprising:
   supplying, when a number of the time slots accommodating the lower-speed signal transmission frame is to be increased, the time slots to input numbers of a cross-connection part of the node device in accordance with an order of time slot numbers of the time slots; and
   re-establishing cross-connections where the input numbers are cross-connected to corresponding output numbers of the cross-connection part so that the cross-connections are prevented from crossing each other, wherein the input numbers input the time slots and the output numbers output the time slots,
   wherein, in the re-establishing, a multicast re-establishing is performed where a first input number having been cross-connected to a first output number is further cross-connected to a second output number, the first input number being included in the input numbers, the first output number and the second output number being included in the output numbers, the second output number not being cross-connected to any of the input numbers before being cross-connected to the first input number, and then the cross-connection from the first input number to the first output number is removed so that the cross-connection from the first input number to the second output number remains, and
   wherein, in the re-establishing, the multicast re-establishing is performed in a case where the number of the time slots is to be increased by one.

2. The transmission method as claimed in claim 1,
   wherein, in the re-establishing, with respect to the cross-connection from the first input number where a time slot is input thereto and the first output number where the time slot is output therefrom, when a time slot number inputting to the existing number is the same, a setting of a current cross-connection is maintained, and when the time slot number inputting to the existing number is different, the multicast re-establishing is executed.

3. The transmission method as claimed in claim 2,
   wherein, in the re-establishing, with respect to a cross-connection from an additional input number inputting no time slot to the existing output number or a cross-connection from the existing input number to the additional output number, a setting of an existing cross-connection is maintained.

4. The transmission method as claimed in claim 1,
   wherein, in the re-establishing, in a case where the number of the time slots is to be increased by two or more, the re-establishing is temporarily stopped when it is determined that a condition that A<B<C or A>B>C is satisfied, where A denotes a time slot number of the output number cross-connected to the input number where a target time slot number of a time slot is to be input, B denotes a time slot number of the output number connected to an input number greater than an input number where the target time slot number of the time slot is to be input, and C denotes the target time slot number, and
   wherein the multicast re-establishing is performed when it is determined that a condition other than A<B<C and A>B>C is satisfied.

5. The transmission method as claimed in claim 4,
   wherein, in the re-establishing, with respect to the cross-connection from the existing input number to the existing output number, when a time slot number inputting to the existing number is the same, a setting of a current cross-connection is maintained, and when the time slot number inputting to the existing number is different, the multicast re-establishing is executed.

6. The transmission method as claimed in claim 5,
   wherein, in the re-establishing, with respect to a cross-connection from an additional input number inputting no time slot to the existing output number or a cross-connection from the existing input number to the additional output number, a setting of an existing cross-connection is maintained.

7. The transmission method as claimed in claim 6,
   wherein, the increase of the number of time slots to accommodate the lower-speed signal transmission frame is executed in a hitless manner where there is no cut off of transmission data.

8. A node device in a network where a lower-speed signal transmission frame is accommodated into plural time slots of a higher-speed signal transmission frame and transmitted, the node device comprising:
   a cross-connection part configured to, when a number of the time slots accommodating the lower-speed signal transmission frame is to be increased, supply the time slots to input numbers of a cross-connection part of the node device in accordance with an order of time slot numbers of the time slots; and
   a re-establishing part configured to re-establish cross-connections where the input numbers are cross-connected to corresponding output numbers of the cross-connection part so that the cross-connections are prevented from crossing each other, wherein the input numbers input the time slots and the output numbers output the time slots,
   wherein the re-establishing part is configured to perform a multicast re-establishing where a first input number having been cross-connected to a first output number is further cross-connected to a second output number, the first input number being included in the input numbers, the first output number and the second output number being included in the output numbers, the second output number not being cross-connected to any of the input numbers before being cross-connected to the first input number, and then the cross-connection from the first input number to the first output number is removed so that the cross connection from the first input number to the second output number remains, and wherein the re-establishing part is configured to perform the multicast re-establishing in a case where a number of time slots to be increased is one.

9. The node device as claimed in claim 8, wherein the re-establishing part is configured to, with respect to a cross connection from the existing input number and an existing output number outputting the time slot, maintain a setting of a current cross-connection when a time slot number inputting to the existing number is the same and execute the multicast replacement when the time slot number inputting to the existing number is different.

10. The node device as claimed in claim 9, wherein the re-establishing part is configured to, with respect to a cross-connection from an additional input number inputting no time slot to the existing output number or a cross-connection from the existing input number to the additional output number, maintain a setting of an existing cross-connection.

11. The node device as claimed in claim 10, wherein, the re-establishing part is configured to, in a case where a number of time slots to be increased is two or more, temporarily stop the multicast re-establishing when it is determined that a condition that A<B<C or A>B>C is satisfied, where A denotes a time slot number of the output number cross-connected to the input number where a target time slot number of a time slot is to be input, B denotes a time slot number of the output number connected to an input number greater than an input number where the target time slot number of the time slot is to be input, and C denotes the target time slot number, and wherein the re-establishing part is configured to perform the multicast re-establishing when it is determined that a condition other than A<B<C and A>B>C is satisfied.

12. The node device as claimed in claim 11, wherein the re-establishing part is configured to, with respect to the cross-connection from the existing input number to the existing output number, maintain a setting of a current cross-connection when a time slot number inputting to the existing number is the same and execute the multicast replacement when the time slot number inputting to the existing number is different.

13. The node device as claimed in claim 12, wherein the re-establishing part is configured to, with respect to a cross-connection from an additional input number inputting no time slot to the existing output number or a cross-connection from the existing input number to the additional output number, maintain a setting of an existing cross-connection.

14. The node device as claimed in claim 13, wherein, the increase of the number of time slots to accommodate the lower-speed signal transmission frame is executed in a hitless manner where there is no cut off of transmission data.

* * * * *